(12) United States Patent
Yanagida et al.

(10) Patent No.: US 10,194,094 B2
(45) Date of Patent: Jan. 29, 2019

(54) IMAGING APPARATUS INCLUDING LIGHT SOURCE THAT EMITS PULSED LIGHT, IMAGE SENSOR, AND CONTROL CIRCUIT

(71) Applicant: Panasonic Intellectual Property Management Co., Ltd., Osaka (JP)

(72) Inventors: Masaaki Yanagida, Kyoto (JP); Muneyuki Matsumoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 72 days.

(21) Appl. No.: 15/613,500

(22) Filed: Jun. 5, 2017

(65) Prior Publication Data

US 2017/0366726 A1 Dec. 21, 2017

(30) Foreign Application Priority Data

Jun. 17, 2016 (JP) .................. 2016-120714

(51) Int. Cl.
| | | |
|---|---|---|
| *H04N 5/225* | (2006.01) | |
| *H04N 9/04* | (2006.01) | |
| *H04N 5/235* | (2006.01) | |
| *H04N 5/355* | (2011.01) | |
| *H04N 5/359* | (2011.01) | |
| *H04N 5/376* | (2011.01) | |

(52) U.S. Cl.
CPC ......... *H04N 5/2353* (2013.01); *H04N 5/2256* (2013.01); *H04N 5/2354* (2013.01); *H04N 5/359* (2013.01); *H04N 5/35563* (2013.01); *H04N 5/376* (2013.01)

(58) Field of Classification Search
CPC .... H04N 5/226; H04N 5/355–5/35527; H04N 5/35563; H04N 5/3745; A61B 5/0033

USPC ...................................................... 348/207.99
See application file for complete search history.

(56) References Cited

U.S. PATENT DOCUMENTS

| | | | |
|---|---|---|---|
| 2010/0231891 A1 | 9/2010 | Mase et al. | |
| 2011/0230738 A1* | 9/2011 | Chance ............... | A61B 5/0059 |
| | | | 600/310 |
| 2013/0088620 A1* | 4/2013 | Centen ............... | G01S 7/4863 |
| | | | 348/273 |

FOREIGN PATENT DOCUMENTS

| | | |
|---|---|---|
| JP | 8-103434 | 4/1996 |
| JP | 2004-045304 | 2/2004 |
| JP | 2009-047662 | 3/2009 |
| JP | 2016-086407 | 5/2016 |

* cited by examiner

*Primary Examiner* — Anthony J Daniels
(74) *Attorney, Agent, or Firm* — McDermott Will & Emery LLP

(57) ABSTRACT

When a time at which a first pulsed light starts arriving at pixels after being reflected by an object is a first time, a time at which the first pulsed light finishes arriving at the pixels is a second time, and a time at which a second pulsed light starts arriving at the pixels after being reflected by the object is a third time, a control circuit decreases sensitivity of the pixels in first part of a first period from the first time including the second time, to a level lower than the sensitivity of the pixels in at least part of a second period after the first period and up to the third time, and increases the sensitivity of the pixels in second part of the first period, to a level higher than the sensitivity of the pixels in the at least part of the second period.

16 Claims, 21 Drawing Sheets

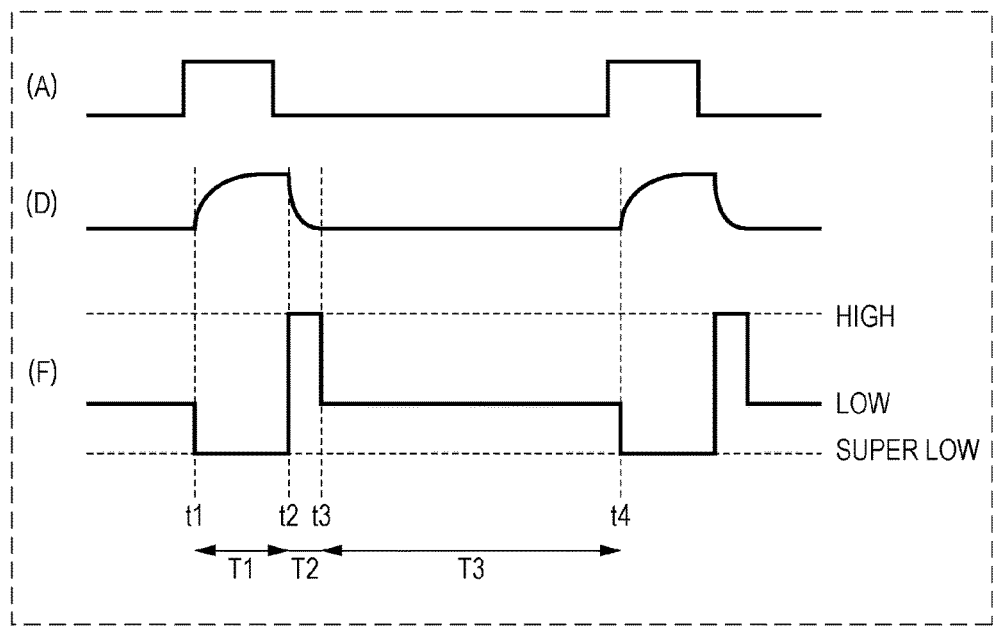
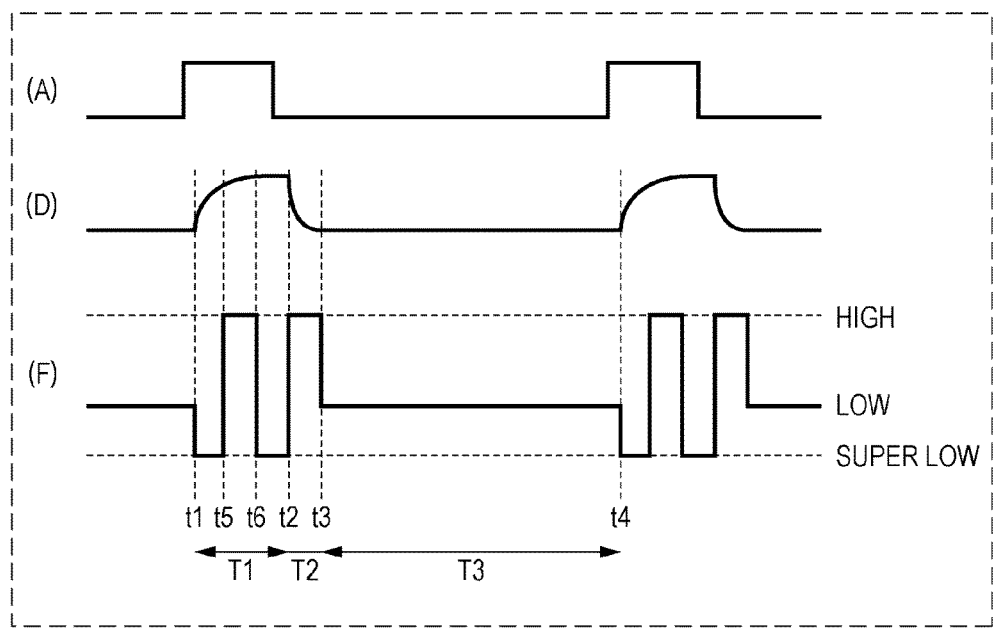

IMAGING APPARATUS INCLUDING LIGHT SOURCE THAT EMITS PULSED LIGHT, IMAGE SENSOR, AND CONTROL CIRCUIT

BACKGROUND

1. Technical Field

The present disclosure relates to an imaging apparatus that acquires information indicating inside of an object.

2. Description of the Related Art

In the fields of biometrics and material analyses, there is used one type of method that irradiates an object with light, and then acquires internal information of the object from information of light passing through the object. For example, Japanese Unexamined Patent Application Publication No. 08-103434 discloses a method of measuring a change in local hemodynamics in a living body, by bringing a light source and a photodetector into intimate contact with a measurement part in a state that the light source and the photodetector are spatially apart at a fixed distance from each other.

SUMMARY

In one general aspect, the techniques disclosed here feature an imaging apparatus including a light source that, in operation, emits first pulsed light and second pulsed light, toward an object, an image sensor including pixels, and a control circuit that, in operation, controls the light source and the image sensor. The control circuit causes the light source to emit the second pulsed light, later than the first pulsed light. When a time at which the first pulsed light starts arriving at the pixels after being reflected by the object is a first time, a time at which the first pulsed light finishes arriving at the pixels is a second time, and a time at which the second pulsed light starts arriving at the pixels after being reflected by the object is a third time, the control circuit decreases sensitivity of the pixels in first part of a first period from the first time including the second time, to a level lower than the sensitivity of the pixels in at least part of a second period after the first period and up to the third time, and the control circuit increases the sensitivity of the pixels in second part of the first period, to a level higher than the sensitivity of the pixels in the at least part of the second period.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5A is a diagram illustrating an example of system control timing according to an exemplary embodiment of the present disclosure;

FIG. 5B is a diagram illustrating another example of system control timing according to an exemplary embodiment of the present disclosure;

DETAILED DESCRIPTION (Underlying Knowledge Forming Basis of the Present Disclosure)

Underlying knowledge forming basis of the present disclosure will be described before description of embodiments of the present disclosure.

In a method of acquiring internal information of an object from information of light passing through the object, mixing of a component of light reflected or dispersed at or immediately below a surface of the object may become a problem. In particular, in measurement of a living body such as brain, a component reflected off a surface of a living body and a component dispersed under skin have high intensity on the order of four to five digits, as compared with that of a component dispersed inside the living body. For detection of a component of light dispersed inside brain, it is necessary to remove influence of a component reflected off a surface and a component dispersed under skin.

According to the method discussed in Japanese Unexamined Patent Application Publication No. 08-103434 described above, it is possible to increase the proportion of a dispersed component of light arrived at brain that is a detection target, by reducing the proportion of a subcutaneously dispersed component included in a detection signal. In this method, however, it is necessary to bring a measuring instrument into intimate contact with a measurement part and to separate an irradiation point and a detection point of light 3 cm away. For this reason, in particular, when measurement continues for a long time, a subject may feel uncomfortable, and a spatial resolution of an obtained brain activity distribution may be low, which is a problem.

In view of such a situation, there may be adopted a method of detecting a component dispersed inside brain, by greatly reducing influence of a surface reflection component having high intensity, by controlling an electronic shutter of an image sensor at a high speed. In this method, pulsed light is emitted toward a living body, and the shutter is turned on in synchronization with timing when the rear end of the pulsed light returning upon dispersed inside the living body is incident on the image sensor. This makes it possible to detect efficiently an inside dispersion component arriving later than a surface reflection component.

Figure 1:
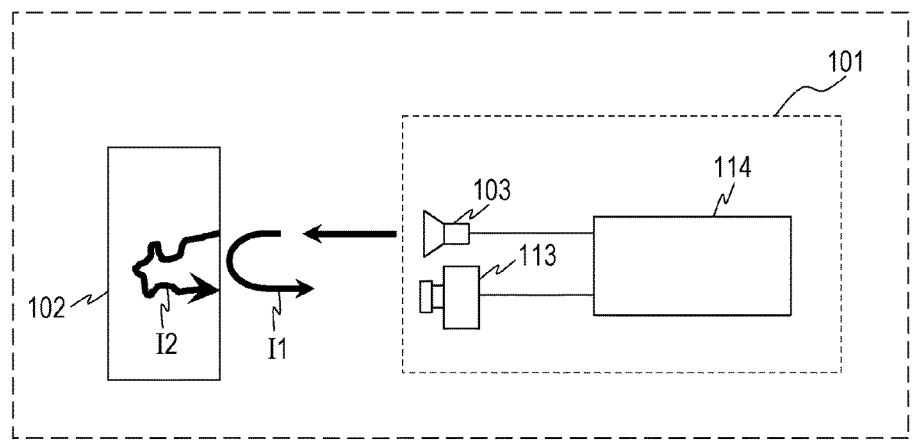
FIG. 1 is a schematic diagram illustrating a schematic configuration of an imaging apparatus.

FIG. 1 is a schematic diagram illustrating a schematic configuration of an imaging apparatus 101 of a study example, which can perform such detection. The imaging apparatus 101 includes a light source 103, an image sensor 113, and a control circuit 114. The light source 103 emits pulsed light having a wavelength of a near-infrared region. The image sensor 113 detects pulsed light returning from an object 102 after emitted from the light source 103. The control circuit 114 controls the light source 103 and the image sensor 113. In this study example, the object 102 is a cerebral blood flow in a human head.

The light source 103 is, for example, a laser pulse light source, and repeats emission of short pulsed light of a near-infrared region, in a high-speed pattern determined by the control circuit 114. When a detection object is a living body, the wavelength of light to be emitted from the light source 103 may be set at, for example, about 650 nm or more and about 950 nm or less. This wavelength range falls within a wavelength range from red to near-infrared rays, and an absorption factor thereof is low in a living body. Therefore, the light source 103 is suitable for a use of acquiring information indicating inside of a living body. In the present specification, a term "light" may be used not only for visible light but also for infrared rays, and the infrared rays may be referred to as "infrared light".

The image sensor 113 has, for example, a high time resolution that allows control of accumulation and discharge of signal charge in a timescale of picosecond to nanosecond. The control circuit 114 controls light-emission timing of the light source 103, and exposure timing of each of the pixels of the image sensor 113.

When the object 102 (e.g., the forehead of a person) is irradiated with light, a surface reflection component I1, which is strong light reflected or dispersed at or immediately below a surface of the object 102, first arrives at the image sensor 113. Next, an inside dispersion component I2, which is weak light returning after being dispersed inside the object 102, arrives at the image sensor 113 later than the surface reflection component I1. The inside dispersion component I2 reflects information indicating a cerebral blood flow, and therefore, the surface reflection component I1 is unnecessary. Accordingly, the imaging apparatus 101 detects only the inside dispersion component I2 dispersed inside the object 102, by controlling timing of exposure performed by an electronic shutter of the image sensor 113.

Figure 2:
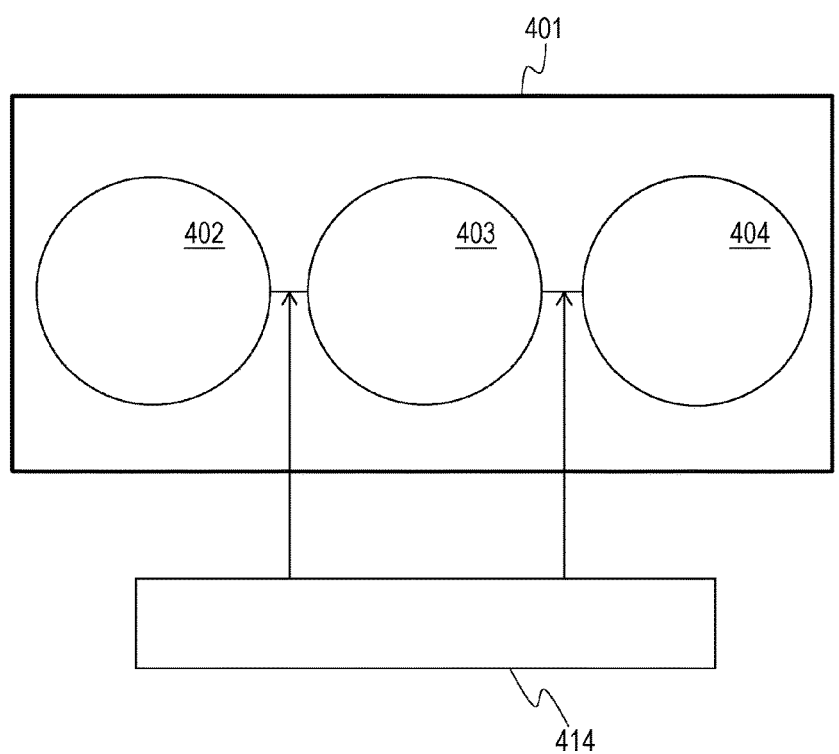
FIG. 2 is a diagram illustrating a configuration of one pixel in the image sensor in a simple manner.

FIG. 2 is a diagram illustrating a configuration of one of pixels 401 in the image sensor 113 in a simple manner. The image sensor 113 has the pixels 401 two-dimensionally arranged on an imaging plane. The image sensor 113 further has a high-speed timing control circuit 414 that controls timing of each of accumulation and discharge of the signal charge of each of the pixels 401. The high-speed timing control circuit 414 operates on the basis of a command from the control circuit 114. In the present specification, the high-speed timing control circuit 414 and the control circuit 114 may be collectively referred to as a "control circuit".

The pixels 401 of the image sensor 113 each include a photodiode 403, a floating diffusion layer 404, and a drain 402. The photodiode 403 is a photoelectric conversion element. The floating diffusion layer 404 is an accumulator that accumulates the signal charge. The drain 402 is a discharger that discharges the signal charge.

When light is incident on each of the pixels 401 as a result of light emission of one pulse, the incident light is converted by the photodiode 403 into signal electrons that are the signal charge. The signal electrons resulting from the conversion are discharged to the drain 402, or distributed to the floating diffusion layer 404 that accumulates the signal charge, in accordance with a control signal inputted from the high-speed timing control circuit 414. This control performed by the high-speed timing control circuit 414 implements the electronic shutter.

Figure 3:
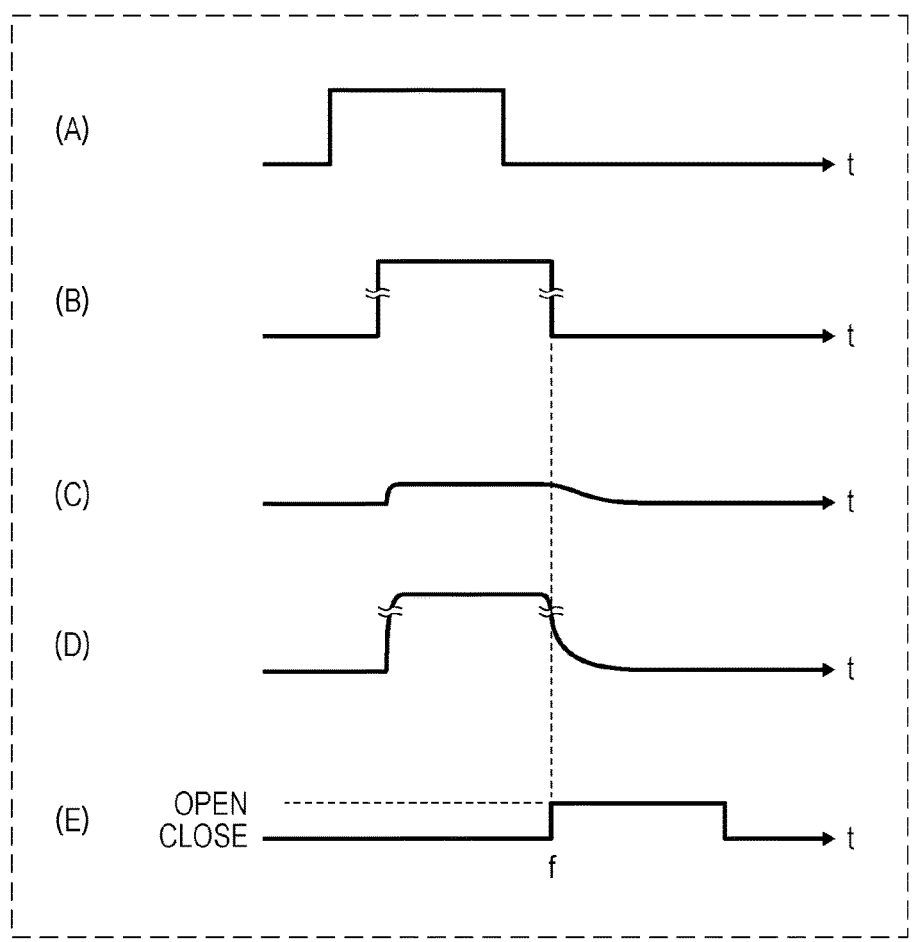
FIG. 3 is a diagram illustrating a relationship between timing when light is emitted from a light source, timing when light from an object is incident on an image sensor, and timing of an electronic shutter.

FIG. 3 is a diagram illustrating a relationship between timing when light is emitted from the image sensor 113, timing when light from the object 102 is incident on the image sensor 113, and timing of the electronic shutter. In FIG. 3, a signal A indicates a waveform of pulsed light emitted from the light source 103. A signal B indicates a waveform of the surface reflection component I1, which is light returning after being reflected off a surface of the object 102, of the pulsed light. A signal C indicates a waveform of the inside dispersion component I2, which is light returning after being dispersed inside a living body, of the pulsed light. A signal D indicates a waveform of light that is a combination of the inside dispersion component I2 and the surface reflection component I1. A signal E indicates timing of each of OPEN and CLOSE of the electronic shutter. A horizontal axis represents time, and a vertical axis represents light intensity in the signal A to the signal D, while representing a state of OPEN or CLOSE of the electronic shutter in the signal E. Here, "CLOSE" refers to a state that the signal charge is discharged to the drain 402. Further, "OPEN" refers to a state that the signal charge is not discharged to the drain 402. The high-speed timing control circuit 414 can control the accumulation of the signal charge in the floating diffusion layer 404 and the discharge of the signal charge to the drain 402 by, for example, changing potential of the signal charge in the floating diffusion layer 404 and the drain 402 through adjustment of a voltage.

When the light source 103 applies pulsed light to the object 102, the surface reflection component I1 and the inside dispersion component I2 are generated, as described above. Since the inside dispersion component I2 is light passing through the object 102, the inside dispersion component I2 has a light path length longer than that of the surface reflection component I1. Therefore, the inside dispersion component I2 arrives at the image sensor 113 later than the surface reflection component I1. The high-speed timing control circuit 414 causes the electronic shutter to be CLOSE while the surface reflection component I1 is incident on the image sensor 113. For example, the high-speed timing control circuit 414 increases a voltage to be applied to the drain 402 to reduce potential energy (hereinafter simply referred to as "potential") of electrons that are the signal charge in the drain 402, so as to discharge the signal charge to the drain 402. When the incidence of the surface reflection component I1 on the image sensor 113 ends (at a time fin FIG. 3), the high-speed timing control circuit 414 causes the electronic shutter to be OPEN. For example, the high-speed timing control circuit 414 decreases the voltage to be applied to the drain 402 to increase the potential of the signal charge in the drain 402, so as to accumulate the signal charge in the floating diffusion layer 404. Afterward, the state of OPEN is maintained until a predetermined time (e.g., a time corresponding to a light emission pulse width) elapses. In the meantime, the signal charge due to the inside dispersion component I2 is accumulated in the floating diffusion layer 404. The high-speed timing control circuit 414 then causes the electronic shutter to be CLOSE again. After a lapse of a predetermined time following the time when the electronic shutter is caused to be CLOSE, the high-speed timing control circuit 414 starts pulsed-light emission again. Afterward, the operation described above is repeated a plurality of times (e.g., from about hundred times to about tens of thousands of times). In the meantime, an image of one frame is generated on the basis of the signal charge accumulated in the floating diffusion layer 404.

In this device, when the electronic shutter is CLOSE, the signal charge due to the surface reflection component I1 is discharged to the drain 402. On the other hand, when the electronic shutter is OPEN, the signal charge due to the inside dispersion component I2 is accumulated in the floating diffusion layer 404. The potential of the signal charge in the photodiode 403, the floating diffusion layer 404, and the drain 402 of each of the pixels is designed to implement the above-described operation.

According to such a method of performing detection by temporally separating pulsed light, it is possible to detect a signal of a blood flow in brain immediately below an irradiation point of light. Therefore, it is possible to measure a brain activity distribution with a resolution higher than that of the technique discussed in Japanese Unexamined Patent Application Publication No. 08-103434 in which the detection is performed through spatial separation.

However, actually, according to the study of the present inventors, even if the electronic shutter is OPEN, not all the signal charge is discharged to the drain 402, and a small portion (e.g., about one 10,000th) of the electric charge leaks to the floating diffusion layer 404. This leakage is found to be large noise leading to a reduction in detection accuracy when a weak biological signal such as a cerebral blood flow is detected. In particular, when detecting a component of very weak light dispersed in brain as in measurement of a cerebral blood flow, it is necessary to increase the intensity of light to be applied, or to increase the number of pulses of light to be emitted. Therefore, in such a case, light leakage noise may be very large, and a signal-to-noise ratio when detecting a dispersed component in brain may be considerably low.

The problem described above will be described in more detail below with reference to FIGS. 4A to 4E.

Figure 4A:
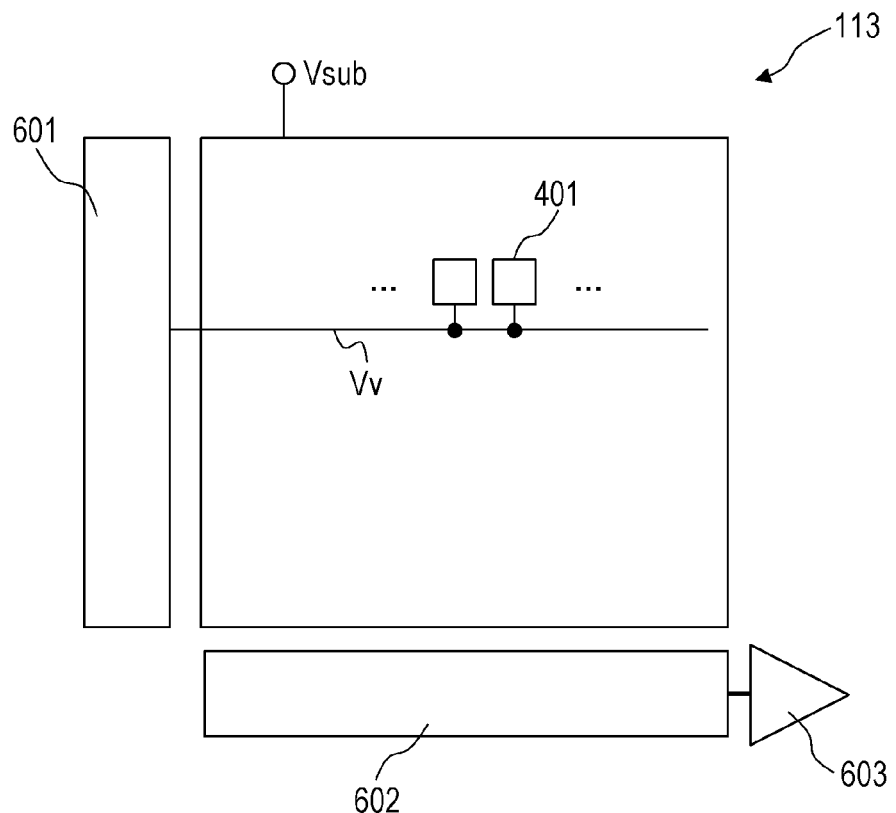
FIG. 4A is a diagram schematically illustrating a configuration example of the image sensor.

FIG. 4A is a diagram schematically illustrating a configuration example of the image sensor 113. Here, the image sensor 113 having a charge coupled device (CCD) structure will be taken as an example. The image sensor 113 includes a pixel array in which the pixels 401 are two-dimensionally arranged on the imaging plane. The image sensor 113 further includes a pixel driving circuit 601, a horizontal CCD 602, and an output circuit 603. The pixel driving circuit 601 corresponds to the high-speed timing control circuit 414 described above.

Figure 4B:
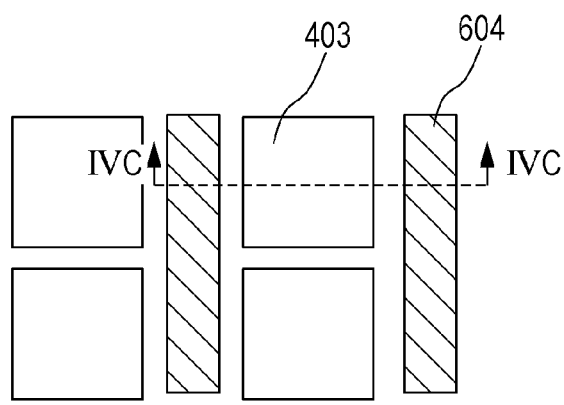
FIG. 4B is a diagram schematically illustrating four adjacent pixels in a pixel array.

FIG. 4B is a diagram schematically illustrating four adjacent pixels among the pixel array. One of the pixels 401 includes the photodiode 403. A vertical CCD 604 is disposed adjacent to the photodiodes 403 arranged in a vertical direction (a lengthwise direction in FIG. 4B). The vertical CCD 604 performs accumulation and transfer of the signal charge. The vertical CCD 604 corresponds to the floating diffusion layer 404 in FIG. 2.

Figure 4C:
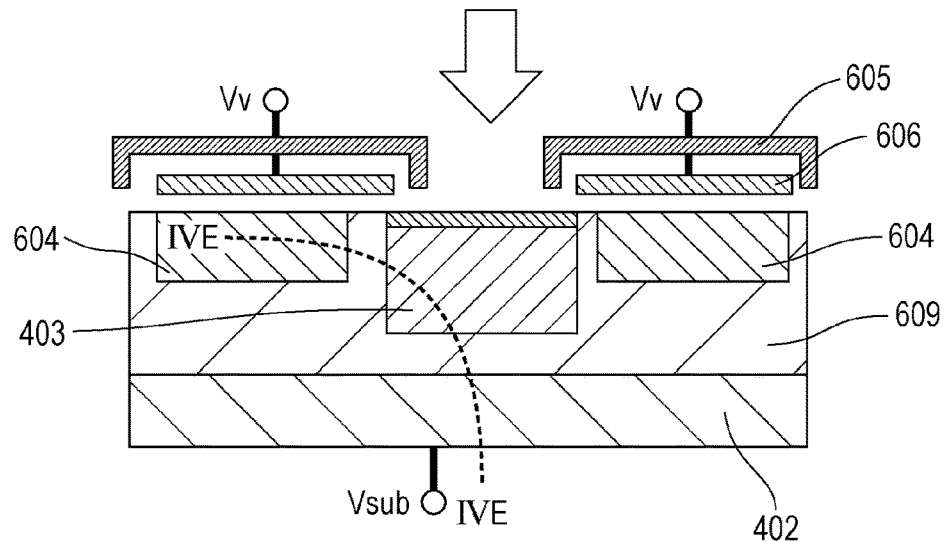
FIG. 4C is a diagram schematically illustrating a cross section taken along a IVC-IVC line in FIG. 4B.

FIG. 4C is a diagram schematically illustrating a cross section taken along a IVC-IVC line in FIG. 4B. An upper part (the front side) of each of the vertical CCDs 604 is provided with an electrode 606 and a shield member 605 covering the electrode 606, as illustrated in FIG. 4C. An oxide film (not illustrated) is present between the electrode 606 and the vertical CCD 604. The drain 402, which is the discharger, is disposed on the back side (at a lower part in FIG. 4C) of the pixel. For example, the drain 402 is an n-type semiconductor substrate. A voltage Vv is applied to the vertical CCD 604. A voltage Vsub is applied to the drain 402. Accumulation of the signal charge in the vertical CCD 604 and discharge of the signal charge are determined by a magnitude relationship between the voltage Vv and the voltage Vsub. The high-speed timing control circuit 414 can control timing of each of the accumulation and the discharge of the signal charge by, for example, adjusting the voltage Vsub while maintaining the voltage Vv constant. For example, a well region 609 of p-type is provided on the drain 402. In the well region 609, the vertical CCD 604 and the photodiode 403 are disposed as illustrated in FIG. 4C. The vertical CCD 604 is, for example, an n-type semiconductor region. The photodiode 403 is configured of, for example, an n-type semiconductor region and a p-type semiconductor region provided thereon.

Figure 4D:
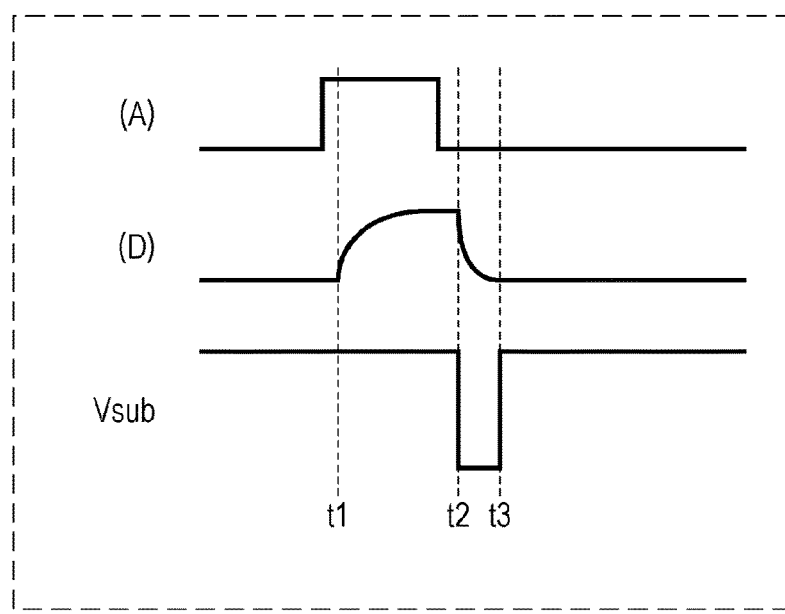
FIG. 4D is a diagram illustrating an example of each of intensity of pulsed light emitted from the light source, intensity of light returning from the object, and temporal change of a voltage Vsub to be applied to a drain.

FIG. 4D is a diagram illustrating an example of each of intensity of pulsed light emitted from the light source 103, intensity of reflected light returning from the object 102, and temporal change of the voltage Vsub applied to the drain 402. In FIG. 4D, a signal A indicates a waveform of pulsed light emitted from the light source 103, and a signal D indicates intensity of reflected light returning from the object 102. Here, the reflected light corresponds to the sum of a surface reflection component and an inside dispersion component. The reflected light starts arriving at the pixels of the image sensor 113 at a time t1. The surface reflection component finishes arriving at the pixels at a time t2. The inside dispersion component finishes arriving at the pixels at a time t3. The pixel driving circuit 601, which is a control circuit, sets the voltage Vsub at a relatively low value in a period from the time t2 to the time t3, and sets the voltage Vsub at a relatively high value in other periods.

Figure 4E:
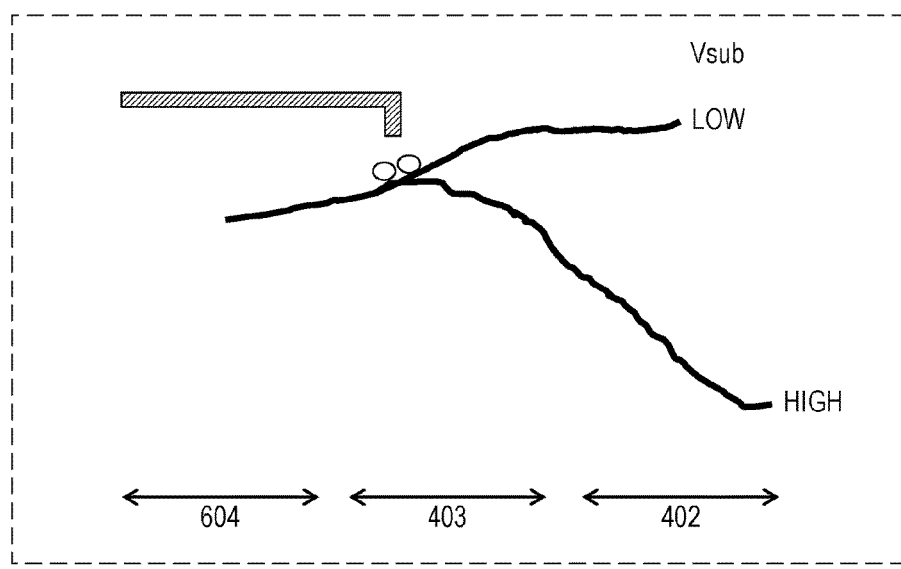
FIG. 4E is a diagram schematically illustrating potential of signal charge along a IVE-IVE line in FIG. 4C.

FIG. 4E is a diagram schematically illustrating potential of electrons, which are the signal charge, along a IVE-IVE line in FIG. 4C. When the voltage Vsub is changed to a LOW state lower than a predetermined value in a state that the voltage Vv is set to a certain value, potential of the electrons in the drain 402 becomes higher than potential in the vertical CCD 604. In other words, a potential gradient in which the electrons proceed to the vertical CCD 604 occurs. In this state, the signal charge is not discharged to the drain 402 and accumulated in the vertical CCD 604. This state corresponds to the electronic shutter in the state of OPEN. On the other hand, when the voltage Vsub is changed to a HIGH state higher than the predetermined value, the potential of the electrons in the drain 402 becomes lower than the potential in the vertical CCD 604. In other words, a potential gradient in which the electrons proceed to the drain 402 occurs. Therefore, the signal charge is discharged to the drain 402. This state corresponds to the electronic shutter in the state of CLOSE. In this state, most of the signal charge is discharged to the drain 402, and almost no signal charge is accumulated in the vertical CCD 604.

However, even if the electronic shutter is in the state of CLOSE, a small amount of the signal charge (for example, about one over tens of thousands of the total) is accumulated in the vertical CCD 604, without being discharged to the drain 402. This is because a peak of the potential of the signal charge is at an end, which is close to the vertical CCD 604, of a region of the photodiode 403. Therefore, signal charge caused by some of light incident at an end of the photodiode 403 may be accumulated in the vertical CCD 604 without being discharged to the drain 402. Further, there is a case where diagonal light is directly incident on the vertical CCD 604. In this case as well, unnecessary signal charge is accumulated. The above-described problem may occur not only in the image sensor having the CCD structure, but also in an image sensor having other type of structure such as a CMOS structure.

The amount of signal charge due to the inside dispersion component I2, which is signal charge accumulated in the accumulator after being photoelectrically converted when the electronic shutter is OPEN, is, for example, one 10,000th of the amount of signal charge due to the surface reflection component I1. For this reason, signal charge due to a leakage of the surface reflection component is mixed in the accumulator at a proportion difficult to ignore, as compared with signal charge due to the inside dispersion component. In such a state, it is difficult to precisely detect a light amount of the inside dispersion component and a temporal change thereof.

The above-described problem is not recognized in conventional imaging apparatuses. When an ordinary object is photographed using a conventional imaging apparatus, the amount of light incident from the object in a state that an electronic shutter is OPEN is overwhelmingly large, as compared with the amount of light leaking to an accumulator in a state that the electronic shutter is OFF. For this reason, the leakage of light poses no problem. However, when detecting weak biometric information such as information indicating a cerebral blood flow deep in the head of a person, it is difficult to ignore a surface reflection component leaking to the accumulator, with respect to an inside dispersion component. Therefore, the above-described problem occurs.

Further, the above-described problem may occur not only in a case where the inside dispersion component of pulsed light is detected, but also, for example, in a case where part of the surface reflection component is detected. A case where a component, which is reflected off an outermost surface, of pulsed light is to be detected will be taken as an example. This component is the front end of the pulsed light. In this case, the electronic shutter is caused to be OPEN, only in a period of detecting the front end of the pulsed light, and the electronic shutter is caused to be CLOSE in other periods. In this case as well, in a period in which, of the surface reflection component of the pulsed light, a part following the front end is incident on the pixels of the image sensor, unnecessary signal charge supposed to be discharged is mixed in the accumulator. Therefore, detection accuracy deteriorates.

The present inventors have come up with a new idea. According to this idea, sensitivity of pixels in a period in which part (for example, an unnecessary surface reflection component) of pulsed light is incident on the pixels of an image sensor is made to be lower than the sensitivity in a period in which the pulsed light is not incident on the pixels. On the basis of such consideration, the present inventors have conceived a configuration of an imaging apparatus to be described below.

[Item 1]

An imaging apparatus according to Item 1 of the present disclosure includes a light source that, in operation, emits first pulsed light and second pulsed light, toward an object; an image sensor including pixels; and a control circuit that, in operation, controls the light source and the image sensor. Here, the control circuit causes the light source to emit the second pulsed light, later than the first pulsed light, and when a time at which the first pulsed light starts arriving at the pixels after being reflected by the object is a first time, a time at which the first pulsed light finishes arriving at the pixels is a second time, and a time at which the second pulsed light starts arriving at the pixels after being reflected by the object is a third time, the control circuit decreases sensitivity of the pixels in first part of a first period from the first time including the second time, to a level lower than the sensitivity of the pixels in at least part of a second period after the first period and up to the third time, and the control circuit increases the sensitivity of the pixels in second part of the first period, to a level higher than the sensitivity of the pixels in the at least part of the second period.

[Item 2]

In the imaging apparatus according to Item 1, the first part of the first period may be shorter than the at least part of the second period.

[Item 3]

In the imaging apparatus according to Item 1, the pixels each may include a photoelectric converter that, in operation, converts incident light into signal charge, and an accumulator that, in operation, accumulates the signal charge, the control circuit may, in operation, control the sensitivity, by controlling transfer efficiency that is a ratio of signal charge to be transferred to the accumulator to the signal charge converted by the photoelectric converter, the control circuit may increase the transfer efficiency in the second part of the first period to a level higher than the transfer efficiency in the at least part of the second period, and the control circuit may decrease the transfer efficiency in the first part of the first period to a level lower than the transfer efficiency in the at least part of the second period.

[Item 4]

In the imaging apparatus according to Item 3, the pixels each may further include a discharger that, in operation, discharges the signal charge, and the control circuit may, in operation, control the transfer efficiency, by changing a potential gradient between the photoelectric converter and the discharger.

[Item 5]

In the imaging apparatus according to Item 3, the pixels each may further include a discharger that, in operation, discharges the signal charge, and the control circuit may, in operation, control the transfer efficiency, by changing a voltage to be applied to the discharger.

[Item 6]

In the imaging apparatus according to Item 5, the control circuit may apply a first voltage to the discharger, in the first part of the first period, a second voltage, which is lower than the first voltage, to the discharger, in the second part of the first period, and a third voltage, which is lower than the first voltage and higher than the second voltage, to the discharger, in the at least part of the second period.

[Item 7]

In the imaging apparatus according to Item 3, the pixels each may further include a discharger that, in operation, discharges the signal charge, and a gate disposed between the photoelectric converter and the discharger, and transferring the signal charge to the discharger from the photoelectric converter in response to an instruction from the control circuit, the control circuit may, in operation, control the transfer efficiency, by changing a voltage to be applied to the gate, and the control circuit may apply a first voltage to the gate, in the first part of the first period, a second voltage, which is lower than the first voltage, to the gate, in the second part of the first period, and a third voltage, which is lower than the first voltage and higher than the second voltage, to the gate, in the at least part of the second period.

[Item 8]

In the imaging apparatus according to Item 1, the pixels each may include a photoelectric converter that, in operation, converts incident light into signal charge, accumulators that, in operation, accumulate the signal charge, and gates, each of the gates disposed between the photoelectric converter and a respective accumulator of the accumulators, and transferring the signal charge from the photoelectric converter to the respective accumulator in response to an instruction from the control circuit, the control circuit may, in operation, control the sensitivity, by changing a voltage to be applied to each of the gates, and the control circuit may apply a first voltage to at least one of the gates, in the first part of the first period, a second voltage, which is higher than the first voltage, to the at least one of the gates, in the second part of the first period, and a third voltage, which is higher than the first voltage and lower than the second voltage, to the at least one of the gates, in the at least part of the second period.

[Item 9]

An imaging apparatus according to Item 9 of the present disclosure includes a light source that, in operation, emits first pulsed light and second pulsed light, toward an object; an image sensor including pixels; and a control circuit that, in operation, controls the light source and the image sensor. Here, the control circuit causes the light source to emit the second pulsed light, later than the first pulsed light, and when a period, in which a first surface reflection component included in the first pulsed light and reflected off a surface of the object is incident on the pixels, and an amount of the first surface reflection component is equal to or larger than an amount of an inside dispersion component included in the first pulsed light and dispersed in inside of the object, is a third period, and a period, in which the inside dispersion component is incident on the pixels, and the amount of the inside dispersion component is larger than the amount of the first surface reflection component, is a fourth period, and a period, which is from end of incidence of the inside dispersion component on the pixels, to start of incidence of a second surface reflection component included in the second pulsed light and reflected off the surface of the object on the pixels, is a fifth period, the control circuit increases sensitivity of the pixels in at least part of the fourth period, to a level higher than the sensitivity of the pixels in at least part of the fifth period, and the control circuit decreases the sensitivity of the pixels in at least part of the third period, to a level lower than the sensitivity of the pixels in the at least part of the fifth period.

[Item 10]

In the imaging apparatus according to Item 9, the at least part of the third period may be shorter than the at least part of the fifth period.

[Item 11]

In the imaging apparatus according to Item 9, the pixels each may include a photoelectric converter that, in operation, converts incident light into signal charge, and an accumulator that, in operation, accumulates the signal charge, the control circuit may, in operation, control the sensitivity, by controlling transfer efficiency that is a ratio of signal charge to be transferred to the accumulator to the signal charge converted by the photoelectric converter, the control circuit may increase the transfer efficiency in the at least part of the fourth period to a level higher than the transfer efficiency in the at least part of the fifth period, and the control circuit may decrease the transfer efficiency in the at least part of the third period to a level lower than the transfer efficiency in the at least part of the fifth period.

[Item 12]

In the imaging apparatus according to Item 11, the pixels each may further include a discharger that, in operation, discharges the signal charge, and the control circuit may, in operation, control the transfer efficiency, by changing a potential gradient between the photoelectric converter and the discharger.

[Item 13]

In the imaging apparatus according to Item 11, the pixels each may further include a discharger that, in operation, discharges the signal charge, and the control circuit may, in operation, control the transfer efficiency, by changing a voltage to be applied to the discharger.

[Item 14]

In the imaging apparatus according to Item 13, the control circuit may apply a first voltage to the discharger, in the at least part of the third period, a second voltage, which is lower than the first voltage, to the discharger, in the at least part of the fourth period, and a third voltage, which is lower than the first voltage and higher than the second voltage, to the discharger, in the at least part of the fifth period.

[Item 15]

In the imaging apparatus according to Item 11, the pixels each may further include a discharger that, in operation, discharges the signal charge, and a gate disposed between the photoelectric converter and the discharger, and transferring the signal charge to the discharger from the photoelectric converter in response to an instruction from the control circuit, the control circuit may, in operation, control the transfer efficiency, by changing a voltage to be applied to the gate, and the control circuit may apply a first voltage to the gate, in the at least part of the third period, a second voltage, which is lower than the first voltage, to the gate, in the at least part of the fourth period, and a third voltage, which is lower than the first voltage and higher than the second voltage, to the gate, in the at least part of the fifth period.

[Item 16]

In the imaging apparatus according to Item 9, the pixels each may include a photoelectric converter that, in operation, converts incident light into signal charge, accumulators that, in operation, accumulate the signal charge, and gates, each of the gates disposed between the photoelectric converter and a respective accumulator of the accumulators, and transferring the signal charge from the photoelectric converter to the respective accumulator in response to an instruction from the control circuit, the control circuit may, in operation, control the sensitivity, by changing a voltage to be applied to each of the gates, and the control circuit may apply a first voltage to at least one of the gates, in the at least part of the third period, a second voltage, which is higher than the first voltage, to the at least one of the gates, in the at least part of the fourth period, and a third voltage, which is higher than the first voltage and lower than the second voltage, to the at least one of the gates, in the at least part of the fifth period.

In the present disclosure, all or a part of any of circuit, unit, device, part or portion, or any of functional blocks in the block diagrams may be implemented as one or more of electronic circuits including, but not limited to, a semiconductor device, a semiconductor integrated circuit (IC) or an LSI. The LSI or IC can be integrated into one chip, or also can be a combination of plural chips. For example, functional blocks other than a memory may be integrated into one chip. The name used here is LSI or IC, but it may also be called system LSI, VLSI (very large scale integration), or ULSI (ultra large scale integration) depending on the degree of integration. A Field Programmable Gate Array (FPGA) that can be programmed after manufacturing an LSI or a reconfigurable logic device that allows reconfiguration of the connection or setup of circuit cells inside the LSI can be used for the same purpose.

Further, it is also possible that all or a part of the functions or operations of the circuit, unit, device, part or portion are implemented by executing software. In such a case, the software is recorded on one or more non-transitory recording media such as a ROM, an optical disk or a hard disk drive, and when the software is executed by a processor, the software causes the processor together with peripheral devices to execute the functions specified in the software. A system or apparatus may include such one or more non-transitory recording media on which the software is recorded and a processor together with necessary hardware devices such as an interface.

Sensitivity of a pixel may be quantified by the amount of signal charge accumulated in an accumulator in the pixel, when light of a unit light amount or unit energy enters a photoelectric conversion element in the pixel. A control circuit can change a potential gradient between the photoelectric conversion element and a discharger, by changing potential of signal charge in the discharger. Changing the potential gradient changes transfer efficiency of the signal charge from the photoelectric conversion element to the accumulator, thereby making it possible to control the sensitivity. The transfer efficiency of the signal charge refers to the ratio of electric charge to be transferred to the accumulator without being discharged, to electric charge generated in the photoelectric conversion element due to light emission of one pulse.

The light arrived at the object 102, which is a light dispersing body, from the light source 103 is divided into the surface reflection component I1 and the inside dispersion component I2, as illustrated in FIG. 1. The surface reflection component I1 is a component reflected off the surface of the object 102. The inside dispersion component I2 is a component reflected or dispersed once, or multiply dispersed, in the inside of the object 102. The surface reflection component I1 includes three components, which are a direct reflection component, a diffusion reflection component, and a dispersion reflection component. The direct reflection component is a component reflected at a reflection angle equal to an incident angle. The diffusion reflection component is a component diffused and reflected by an irregular shape of a surface. The dispersion reflection component is a component dispersed and reflected by internal tissue near the surface. When the object 102 is skin of a person, the dispersion reflection component is a component dispersed and reflected inside the skin. In the present disclosure, the surface reflection component I1 includes these three components. Further, the inside dispersion component I2 does not include a component dispersed and reflected by the internal tissue near the surface.

FIG. 5A is a diagram illustrating an example of system control timing according to an exemplary embodiment of the present disclosure. In FIG. 5A, a signal A indicates intensity of pulsed light emitted from the light source 103, a signal D indicates intensity of reflected light returning from the object 102, and a signal F indicates sensitivity of a pixel. Here, the reflected light corresponds to the sum of a surface reflection component I1 and an inside dispersion component I2. In an embodiment of the present disclosure, when reflected light is detected, the sensitivity of the pixel is controlled in at least three phases. Basic operation in one embodiment of the present disclosure will be described below, using a configuration of the imaging apparatus 101 illustrated in FIG. 1 as an example.

The control circuit 114 causes the light source 103 to emit rays of pulsed light including first pulsed light and second pulsed light. The second pulsed light is emitted later than the first pulsed light. Here, a period in which the surface reflection component I1 among the first pulsed light is incident on the pixel of the image sensor 113 is a first period T1. The first period T1 is a period from a time t1 at which incidence of the surface reflection component I1 on the pixel begins, to a time t2 at which at which the incidence of the surface reflection component I1 on this pixel ends. A period from the time t2 to a time t3 at which incidence of the inside dispersion component I2 of the first pulsed light on the pixel ends is a second period T2. It is conceivable that, in the second period T2, the surface reflection component I1 of the pulsed light may be hardly incident on the pixel, and only the inside dispersion component I2 may be incident on this pixel. Further, a period from the time t3 to a time t4 at which incidence of the surface reflection component I1 of the second pulsed light on the pixel begins is a third period T3. The third period T3 is a period in which none of the components of the pulsed light from the light source 103 is incident on the pixel. The time t1 corresponds to a first time in the present disclosure. The time t3 corresponds to a second time in the present disclosure. The time t4 corresponds to a third time in the present disclosure. The first period T1 corresponds to a third period in the present disclosure. The second period T2 corresponds to a fourth period in the present disclosure. The third period T3 corresponds to a fifth period in the present disclosure.

The control circuit 114 in the present embodiment sets the sensitivity of the pixel to the lowest level (to be expressed as a level of "Super LOW"), so as to control light leakage noise due to the surface reflection component I1, in at least part of the first period T1. In the example illustrated in FIG. 5A, the control circuit 114 sets the sensitivity of the pixel to the level of Super LOW in the whole first period T1. The control circuit 114 sets the sensitivity of the pixel to the highest level (to be expressed as a level of "HIGH"), so as to detect the inside dispersion component I2, in at least part of the second period T2. In the example illustrated in FIG. 5A, the control circuit 114 sets the sensitivity of the pixel to the level of HIGH in the whole second period T2. The control circuit 114 sets the sensitivity of the pixel to a level (to be expressed as a level of "LOW") lower than HIGH and higher than Super LOW, so as to reduce influence of background light and dark current, in at least part of the third period T3. In the example illustrated in FIG. 5A, the control circuit 114 sets the sensitivity of the pixel to the level of LOW in the whole third period T3. In this way, the control circuit 114 sets the sensitivity of the pixel in at least part of the second period T2 to be higher than the sensitivity of the pixel in each of at least part of the first period T1 and at least part of the third period T3. In addition, the control circuit 114 sets the sensitivity of the pixel in at least part of the first period T1 to be lower than the sensitivity of the pixel in at least part of the third period T3. Such control makes it possible to detect the inside dispersion component I2 efficiently, while suppressing light leakage noise due to the surface reflection component I1. In the example illustrated in FIG. 5A, the sensitivity of the pixel is constant in each of the first period T1, the second period T2, and the third period T3. However, the sensitivity may vary in each of these periods. Such variation is acceptable if average sensitivity in each of the periods is at the lowest level in the first period T1, at the highest level in the second period T2, and at the middle level in the third period T3.

Any period may be set as the first period T1, if this period is a period in which, of the first pulsed light, the surface reflection component reflected off a surface of an object is greater than the inside dispersion component dispersed inside the object and is incident on the pixel of the image sensor. Similarly, any period may be set as the second period T2, if this period is a period in which the inside dispersion component of the first pulsed light is greater than the surface reflection component and is incident on the pixel.

As a method of decreasing the sensitivity of the pixel in the first period T1 to a level below the sensitivity of the pixel in the third period T3, the following methods are typically conceivable.

(1) Efficiency of converting photons into electrons or positive holes, which are signal charge, is reduced.

(2) Efficiency of transferring generated signal charge to an accumulator is reduced.

The former can be implemented by, for example, a sensor such as an image sensor having an organic photoelectric conversion film in which quantum efficiency can be changed by a voltage to be applied. The latter can be implemented by, for example, a sensor such as CCD and CMOS image sensors in which efficiency of transferring signal charge generated in a photoelectric conversion element in a pixel to an accumulator can be controlled by a voltage to be applied.

For merely suppressing the light leakage noise due to the surface reflection component I1, it is also conceivable that other configuration may be adopted instead of setting the sensitivity of the pixel in three phases. For example, there may be adopted such a configuration that the sensitivity of the pixel in the first period T1 and the third period T3 is uniformly set to be lower than an OFF level that is normal sensitivity of the pixel when the electronic shutter is OFF. However, in such a configuration, a period in which a high voltage is applied to a device increases, which may lead to a decline in reliability accompanying time degradation. Therefore, in an embodiment of the present disclosure, the sensitivity of the pixel is set to be lower than the normal OFF level, only in the first period T1 in which the surface reflection component I1 of the pulsed light is incident on the pixel. In the third period T3 in which the pulsed light is not incident on the pixel, the sensitivity of the pixel is set to be equal to or higher than the normal OFF level. Typically, the first period T1 is shorter than the third period T3. In other words, a period in which an extremely high voltage corresponding to the level of Super LOW is applied is shorter than a period in which a voltage corresponding to the level of LOW is applied. For this reason, according to an embodiment of the present disclosure, it is possible to increase long-time reliability of an apparatus, as compared with a configuration in which the sensitivity of a pixel is set to the level of Super LOW, uniformly in the first period T1 and the third period T3.

The present disclosure is not limited to a mode of detecting the inside dispersion component of the pulsed light. For example, a technique of the present disclosure is also applicable to a mode of further detecting part of the surface reflection component I1, such as the front end of the pulsed light. FIG. 5B is a diagram illustrating another example of system control timing according to an exemplary embodiment of the present disclosure. In such a mode, the control circuit 114 sets the sensitivity of the pixel in a period from a time t5 to a time t6, which is part of the first period T1 in which the surface reflection component I1 of the pulsed light is incident on the pixel of the image sensor 113, to the level of HIGH. Further, the control circuit 114 sets the sensitivity of the pixel in other parts of the first period T1 to the level of Super LOW. In addition, in a manner similar to FIG. 5A, the control circuit 114 sets the sensitivity of the pixel in at least part of the second period T2 to the level of HIGH, and sets the sensitivity of the pixel in at least part of the third period T3 to the level of LOW.

Some embodiments of the present disclosure will be described below in detail with reference to the drawings. Any of the embodiments to be described below represents a comprehensive or specific example. Numerical values, shapes, materials, components, connection configurations and arrangements of components, steps, step sequences, and the like employed in the embodiments to be described below are mere examples, and are not intended to limit the present disclosure. It is possible to combine various aspects described in the present specification unless a contradiction arises. Further, among the components in the embodiments to be described below, a component not recited in any of independent Claims each representing the broadest concept will be described as a freely selectable component. In the following description, substantially same or similar components will be provided with a common reference character, and redundant description may be omitted.

First Embodiment

Figure 6A:
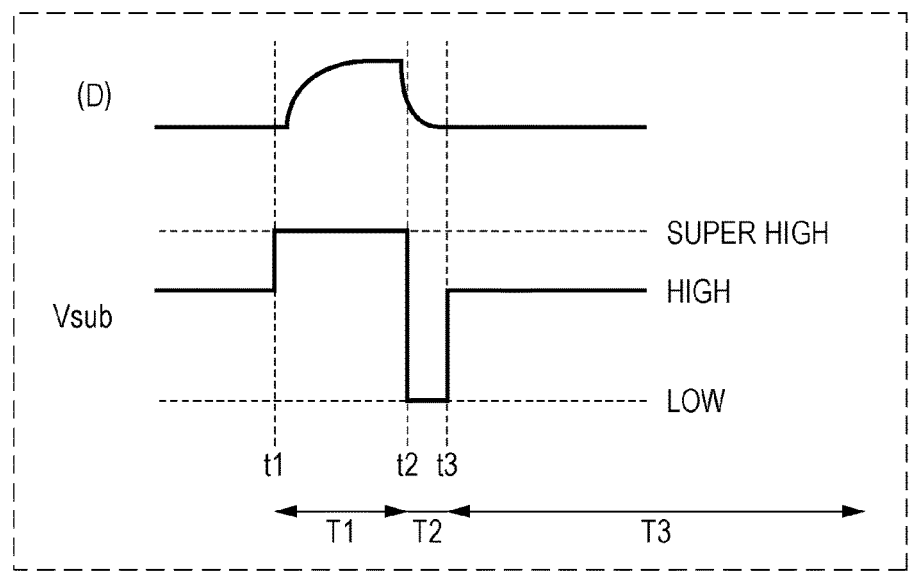
FIG. 6A is a timing chart illustrating an example of control according to a first embodiment.

First, an imaging apparatus according to a first embodiment of the present disclosure will be described. An imaging apparatus 101 in the present embodiment has the same physical configuration as that of the imaging apparatus 101 in FIG. 1. In the present embodiment as well, an image sensor 113 has the configuration illustrated in each of FIGS. 4A to 4C. The present embodiment is different from the above-described study example, in that a control method illustrated in FIG. 6A is used in place of a control method illustrated in FIG. 4D. Operation in the present embodiment will be described below.

First, a process of detecting light with the image sensor 113 and outputting an electric signal according an amount of light received will be described. When light is incident on a photodiode 403, which is a photoelectric conversion element, signal charge is generated by photoelectric conversion and then transferred to a vertical CCD 604, which is an accumulator. The vertical CCD 604 disposed in each column transfers the signal charge in a vertical direction (a downward direction in FIG. 4B). The vertical CCD 604 is controlled by a voltage Vv, which is a control signal supplied from a pixel driving circuit 601, which is a control circuit. The signal charge transferred from the vertical CCD 604 in each column is sequentially transferred in a horizontal direction (a rightward direction in FIG. 4A) by a horizontal CCD 602. The transferred signal charge is finally converted into a voltage, amplified, and then outputted by the output circuit 603.

FIG. 6A is a timing chart illustrating an example of control in the present embodiment. The pixel driving circuit 601 controls an electronic shutter, by changing a voltage Vsub to be applied to a semiconductor substrate, which is a drain 402, on the basis of a command from a control circuit 114 (FIG. 1). The pixel driving circuit 601 controls the value of the voltage Vsub in three phases in synchronization with reflected light returning from the object 102 after being reflected or dispersed by the object 102. Specifically, the voltage Vsub is set to a level of Super High, which is the highest voltage, in a first period T1 from a time t1 at which a surface reflection component I1 of pulsed light starts arriving at the image sensor 113 to a time t2 at which the surface reflection component I1 finishes arriving at the image sensor 113. This suppresses light leakage noise due to the surface reflection component I1. In a second period T2 from the time t2 to a time t3, during which only an inside dispersion component I2 among components of the pulsed light is incident on the image sensor 113, the voltage Vsub is set to a level of LOW that is the lowest voltage. Signal charge due to the inside dispersion component I2 is thereby accumulated in the vertical CCD 604. In a third period T3 from the time t3 to a time t4, during which none of the components of the pulsed light is incident on the image sensor 113, the voltage Vsub is set to a level of HIGH, which is lower than Super High and higher than LOW. This reduces influence of background light and dark current.

The value of the voltage Vsub in each of the first period T1, the second period T2, and the third period T3 is determined as appropriate in accordance with specifications of the image sensor 113. For example, assume that a voltage when the electronic shutter is OFF (may be referred to as a "normal level of HIGH") is 15 V, in the study example in which the control illustrated in FIG. 4D is performed. In this example, the voltage Vsub in each of the first period T1, the second period T2, and the third period T3 may be set to be, for example, 18 V corresponding to the level of Super High, 0 V corresponding to the level of LOW, and 13 V corresponding to the level of HIGH, respectively. In this example, the voltage Vsub in the first period T1 is set to be higher than the normal level of HIGH, and thus, the voltage Vsub in the third period T3 is set to be lower than the normal level of HIGH. This is to reduce a period in which a high voltage is applied, and to ensure long-term reliability of the device. An average voltage in each of the periods can be set so that, for example, an average voltage per cycle is about equal to the average voltage in the study example in which binary control is performed.

Figure 6B:
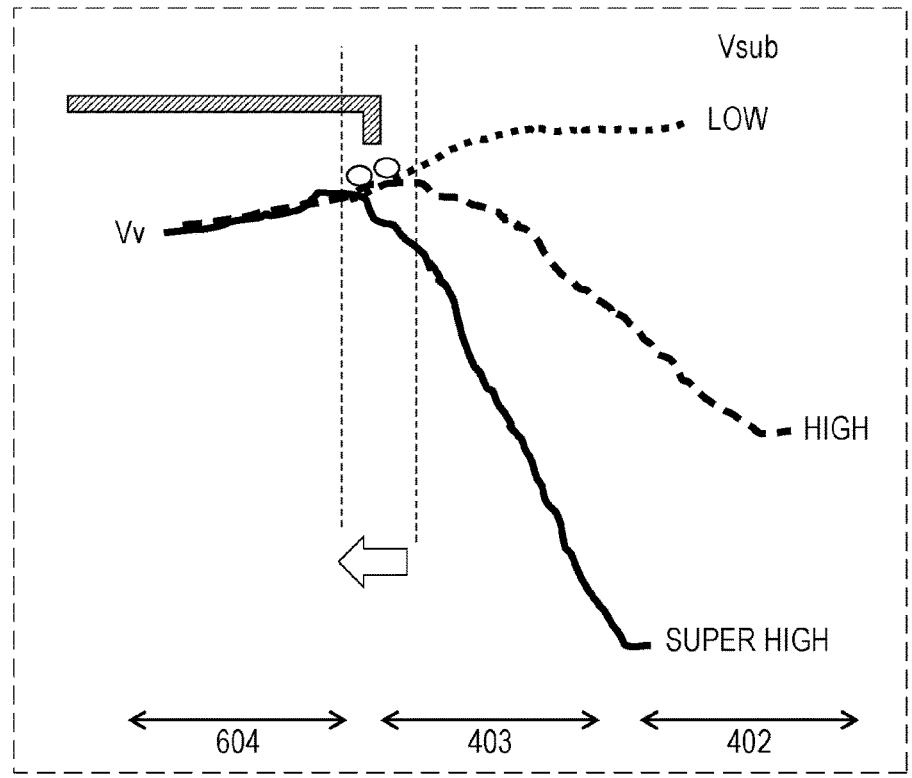
FIG. 6B is a diagram schematically illustrating potential of signal charge along the IVE-IVE line in FIG. 4C according to the first embodiment.

FIG. 6B is a diagram schematically illustrating potential of electrons that are signal charge along the IVE-IVE line in FIG. 4C, in the present embodiment. Here, the voltage Vv applied to an electrode 606 facing the vertical CCD 604 is set to be a certain constant value. When the voltage Vsub changes from a state of HIGH to a state of Super High, potential of signal charge in the drain 402 decreases. In other words, a potential gradient between the photodiode 403 and the drain 402 becomes larger. This shifts the position of a peak of the potential of the signal charge to the position of the vertical CCD 604, as indicated with an arrow in FIG. 6B. As a result, among the electric charge generated in the photodiode 403, a larger amount of electric charge is discharged to the drain 402, and leakage of the signal charge to the vertical CCD 604 is suppressed.

Figure 7:
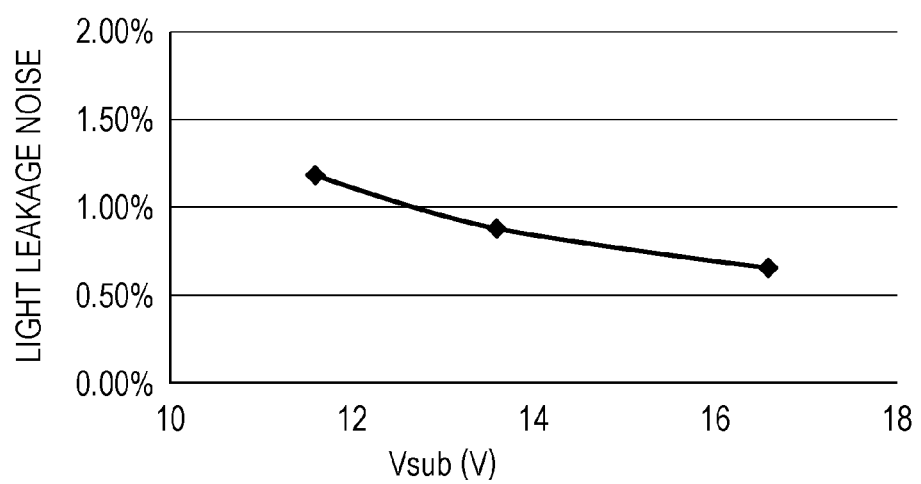
FIG. 7 is a graph illustrating a result of an experiment of measuring an amount of light leakage noise by using an imaging apparatus according to the first embodiment.

FIG. 7 is a graph illustrating a result of an experiment in which an amount of light leakage noise is measured using the imaging apparatus 101 of the present embodiment. This graph illustrates a relationship between the proportion of the light leakage noise and the voltage Vsub. In the graph, a horizontal axis indicates the voltage Vsub, and a vertical axis indicates the proportion of the light leakage noise to the entire signal. Found from this result of the experiment is that the higher the voltage Vsub is, the more the light leakage noise is suppressed. This is because, as the voltage Vsub becomes higher, the potential of the signal charge in the drain 402 becomes lower, and the proportion of the signal charge discharged to the drain 402 becomes greater.

In view of this result, it is also conceivable that, to suppress the light leakage noise due to the surface reflection component I1, the voltage Vsub may only be set to a high voltage corresponding to Super High, in the whole period except for the second period T2 in which the inside dispersion component I2 is detected. For example, it is conceivable that, when the normal voltage level of the electronic shutter being OFF is 13 V, the voltage Vsub may be set to 18 V in the first period T1 and the third period T3, and the voltage Vsub may be set to a voltage near 0 V only in the second period T2.

However, such a configuration may lead to a decline in reliability due to time degradation. This will be described with reference to FIGS. 8A to 8C.

Figure 8A:
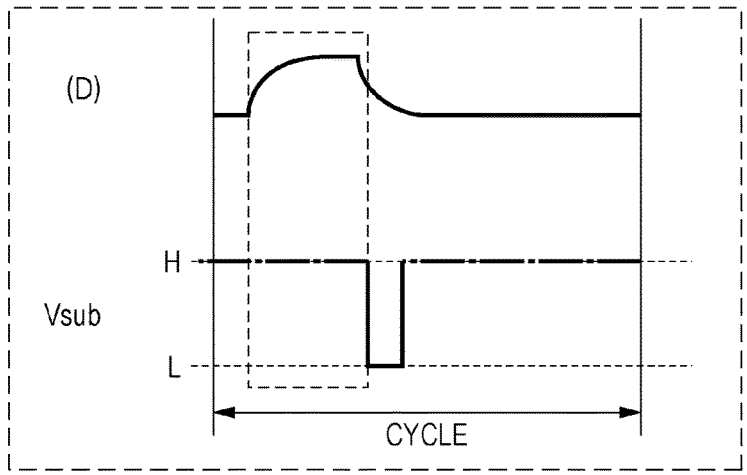
FIG. 8A is a timing chart illustrating temporal change in one cycle of each of reflected light and a voltage Vsub, in a comparative example of controlling the voltage Vsub in binary of High (H) and Low (L)
Figure 8B:
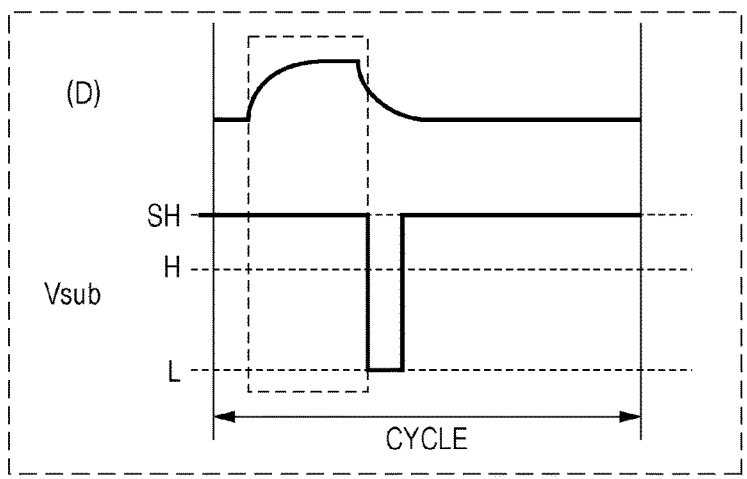
FIG. 8B is a timing chart illustrating temporal change in one cycle of each of reflected light and a voltage Vsub, in a comparative example of controlling the voltage Vsub in binary of Super High (SH) and Low (L)
Figure 8C:
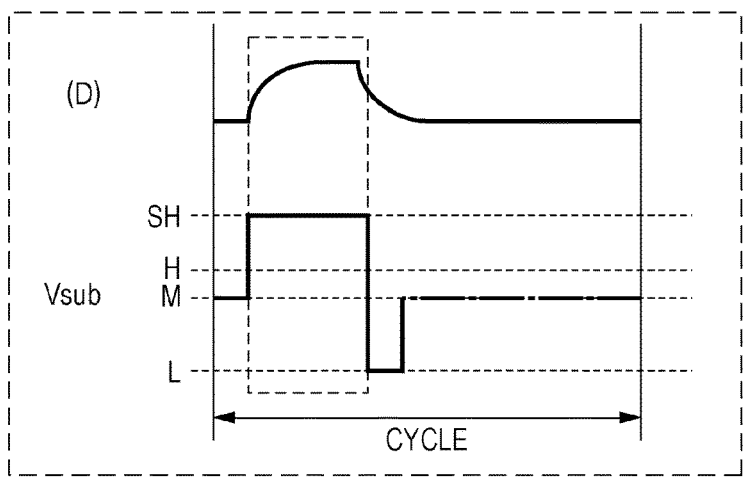
FIG. 8C is a timing chart illustrating temporal change in one cycle of each of reflected light and a voltage Vsub, according to the first embodiment of controlling the voltage Vsub in ternary of Super High (SH), Middle (M), and Low (L)

FIG. 8A is a timing chart illustrating temporal change in one cycle of each of reflected light and a voltage Vsub, in a comparative example of controlling the voltage Vsub in binary of High (H) and Low (L). FIG. 8B is a timing chart illustrating temporal change in one cycle of each of reflected light and a voltage Vsub, in a comparative example of controlling the voltage Vsub in binary of Super High (SH) and Low (L). FIG. 8C is a timing chart illustrating temporal change in one cycle of each of reflected light and the voltage Vsub, in the present embodiment of controlling the voltage Vsub in ternary of Super High (SH), Middle (M), and Low (L).

In FIGS. 8A to 8C, the largest influence of the surface reflection component I1 appears in a period surrounded by a broken line. Therefore, in order to suppress the noise further than that in the comparative example illustrated in FIG. 8A, the voltage Vsub may be set to a higher level, for example, to the level of Super High, in the period surrounded by the broken line. However, there is a trade-off relationship between noise and reliability. If the voltage Vsub is set to be SH in the whole period except for the period for detection of the inside dispersion component as in the comparative example illustrated in FIG. 8B, a failure due to time degradation may easily occur. Therefore, in the present embodiment, the voltage Vsub is set to a level (M) between SH and L, in a period in which neither the surface reflection component nor the inside dispersion component of the pulsed light is incident on the pixel, as illustrated in FIG. 8C. Here, the level M is a voltage lower than the level H.

In general, for example, failures listed in the following Table 1 may occur, in a solid-state image sensing device such as CCD and CMOS, due to a reduction in thickness of an oxide film accompanying progress of miniaturization, and a reduction in separation width between wirings varying in electric potential.

TABLE 1

| Failure Part | Failure Mode |
| --- | --- |
| Gate oxide film | Leakage or breakdown due to time degradation |
| Between wirings varying in electric potential | Leakage or breakdown due to time degradation |

Here, breakdown due to time degradation of a gate oxide film is a phenomenon (Time Dependent Dielectric Breakdown (TDDB)) in which breakdown occurs due to long-time application of voltage as leakage current rises with time, even if field intensity is equal to or less than a dielectric breakdown voltage (e.g., about 10 MV/cm). Further, breakdown due to time degradation between wirings varying in electric potential is a failure of blowout breakdown. The blowout breakdown is caused as follows. Due to introduction of Cu (copper) wiring and reduction in separation between wirings accompanying miniaturization, field intensity between adjacent wirings varying in electric potential increases, thereby causing Cu ions to drift, so that a leak path is formed. When overcurrent flows into the leak path, which is thin, the blowout breakdown occurs. This breakdown is called TDDB between wirings.

For example, a mean time to failure (MTTF) in oxide-film time-dependent breakdown is expressed by the following expression.

$$MTTF = A * 10^{(-\beta * \Delta E)} \quad (1)$$

$$\Delta E = \frac{\Delta V}{t_{ox}} \quad (2)$$

Here, $\Delta E$ represents field intensity (MV/cm), $\Delta V$ represents applied voltage (MV), $\beta$ represents field intensity coefficient (cm/MV), and $t_{ox}$ represents oxidation film thickness (cm). Expression (1) represents a mean time to failure when application of a constant voltage $\Delta V$ to an oxide film continues. A term related to dependence of life on temperature is omitted for brief description.

As apparent from Expressions (1) and (2), the higher the applied voltage is, the shorter the mean time to failure is. For this reason, it is desirable that the time for application of a high voltage to a device be shorter, from the viewpoint of long-term reliability.

Therefore, in the present embodiment, the voltage Vsub is set to be the highest only in a period in which the influence of the surface reflection component I1 is the greatest, and the voltage is lowered in other periods in which the electronic shutter is OFF, as illustrated in FIG. 8C. It is possible to make an average voltage per cycle equal to an average voltage of the comparative example illustrated in FIG. 8A, by appropriately setting the voltage level in each period, considering the proportion of the period in which the voltage Vsub per cycle is the highest. Such a configuration makes it possible to keep long-term reliability equivalent to that of the comparative example illustrated in FIG. 8A.

Second Embodiment

Next, an imaging apparatus according to a second embodiment of the present disclosure will be described.

Figure 9A:
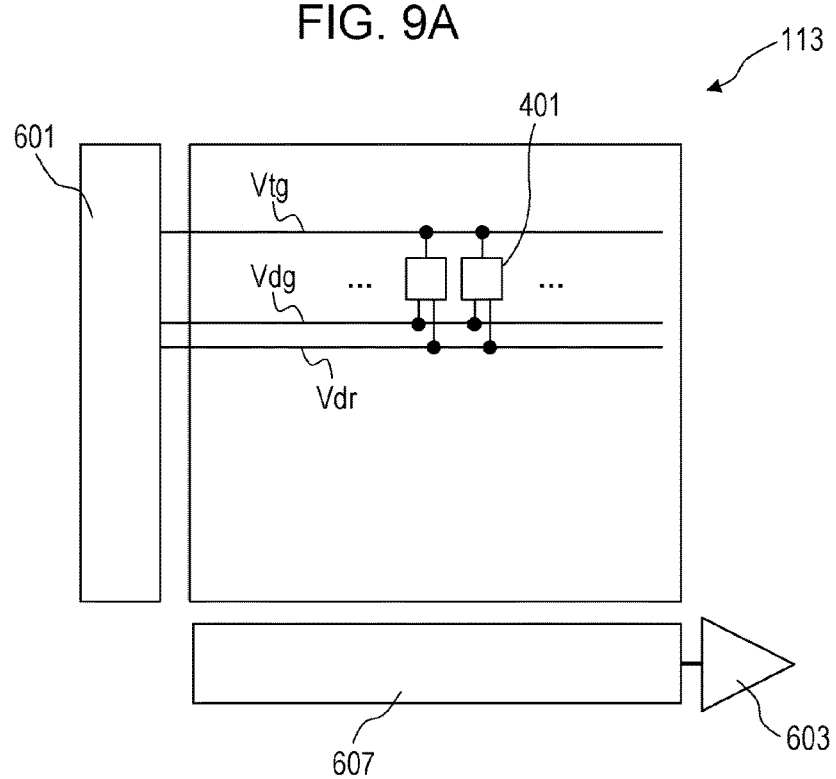
FIG. 9A is a diagram schematically illustrating a configuration of an image sensor according to a second embodiment.

FIG. 9A is a diagram schematically illustrating a configuration of an image sensor 113 in the present embodiment. The image sensor 113 includes a pixel array in which pixels 401 are two-dimensionally arranged on an imaging plane. The image sensor 113 further includes a pixel driving circuit 601, a horizontal transfer circuit 607, and an output circuit 603.

Figure 9B:
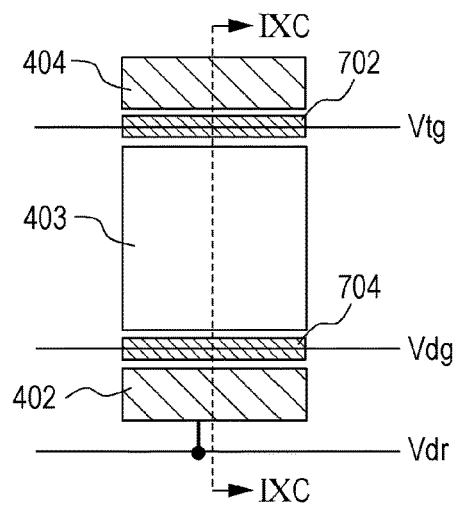
FIG. 9B is a diagram schematically illustrating a configuration of one pixel according to the second embodiment.

FIG. 9B is a diagram schematically illustrating a configuration of one of the pixels 401 in the present embodiment. The pixels 401 each include a photodiode 403, a floating diffusion layer 404, a drain 402, a transfer gate 702, and a drain gate 704. The photodiode 403 is a photoelectric conversion element. The floating diffusion layer 404 is an accumulator. The drain 402 is a discharger flush with the floating diffusion layer 404. The transfer gate 702 is provided between the photodiode 403 and the floating diffusion layer 404. The drain gate 704 is provided between the photodiode 403 and the drain 402. Voltages Vtg, Vdg, and Vdr are applied from the pixel driving circuit 601 to the transfer gate 702, the drain gate 704, and the drain 402, respectively, in each of the pixels, row by row. The drain gate 704 corresponds to a gate in the present disclosure.

A process of detecting light and outputting a signal in the present embodiment will be described. First, the photodiode 403, which is the photoelectric conversion element, converts light into signal charge and transfers the signal charge to the floating diffusion layer 404 that is the accumulator. Next, the floating diffusion layer 404 converts the signal charge into a voltage, and then an amplification transistor in the pixel amplifies a signal and outputs the amplified signal to a vertical signal line disposed in each column. Afterward, the horizontal transfer circuit 607 transfers the signal of each column sequentially in a horizontal direction, and finally, the output circuit 603 amplifies the signal and outputs the amplified signal. An electronic shutter is controlled by the voltage Vdr applied to the drain 402 in the pixel, or the voltage Vdg applied to the drain gate 704.

Figure 9C:
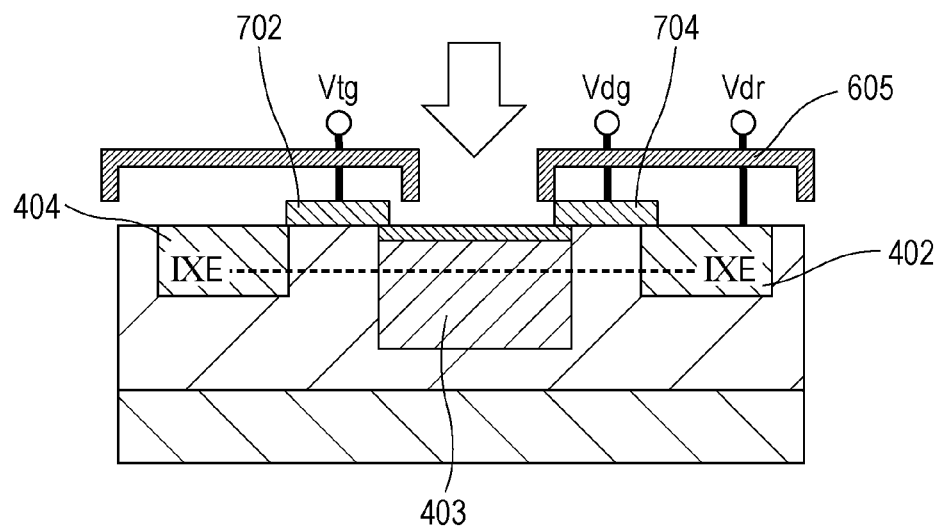
FIG. 9C is a diagram schematically illustrating a cross section taken along a IXC-IXC line in FIG. 9B.

FIG. 9C is a diagram schematically illustrating a cross section taken along a IXC-IXC line in FIG. 9B. The image sensor 113 in the present embodiment has a CMOS configuration having a horizontal drain. An upper layer of the photodiode is open to receive light. An upper layer of each of the floating diffusion layer 404 and the drain 402 is shielded by the shield member 605. The transfer gate 702 is controlled by the voltage Vtg, the drain gate 704 is controlled by the voltage Vdg, and the drain 402 is controlled by the voltage Vdr. The pixel driving circuit 601 in the present embodiment maintains each of the voltages Vtg and Vdr constant, and controls the voltage Vdg of the drain gate 704 in a pulsed manner.

Figure 9D:
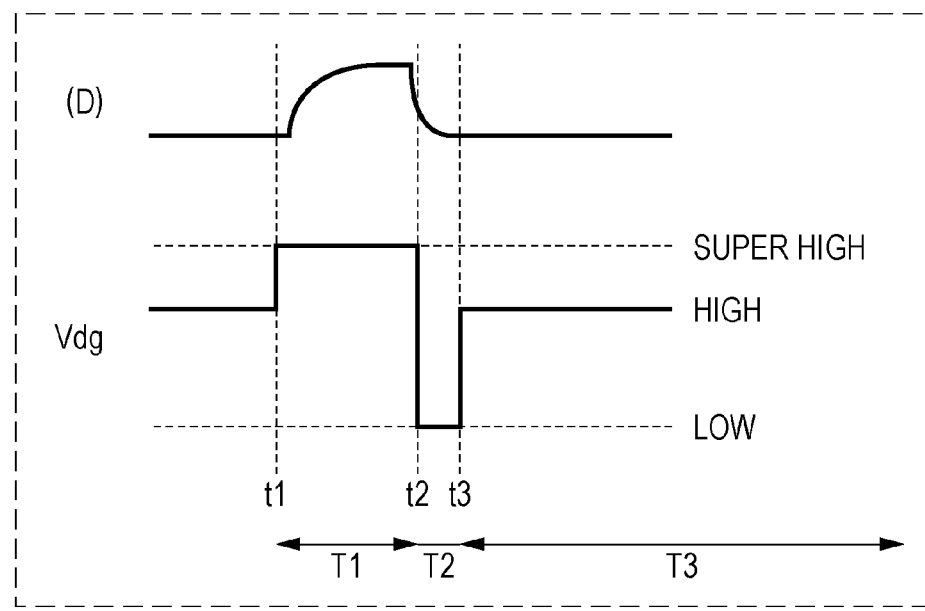
FIG. 9D is a timing chart illustrating control according to the second embodiment.

FIG. 9D is a timing chart illustrating control in the present embodiment. The pixel driving circuit 601 controls the voltage Vdg of the drain gate in three levels in synchronization with reflected light returning from the object 102 after being reflected or dispersed. Specifically, in a first period T1 in which a surface reflection component I1 is incident, the voltage Vdg is set to a level of Super High, which is the highest voltage. In a second period T2 in which an inside dispersion component I2 is incident after ending of the incidence of the surface reflection component I1, the voltage Vdg is set to a level of LOW, which is the lowest voltage. In a third period T3 in which none of components of pulsed light is incident, the voltage Vdg is set to a level of HIGH, which is lower than Super High and higher than LOW, so as to reduce background light and dark current.

Figure 9E:
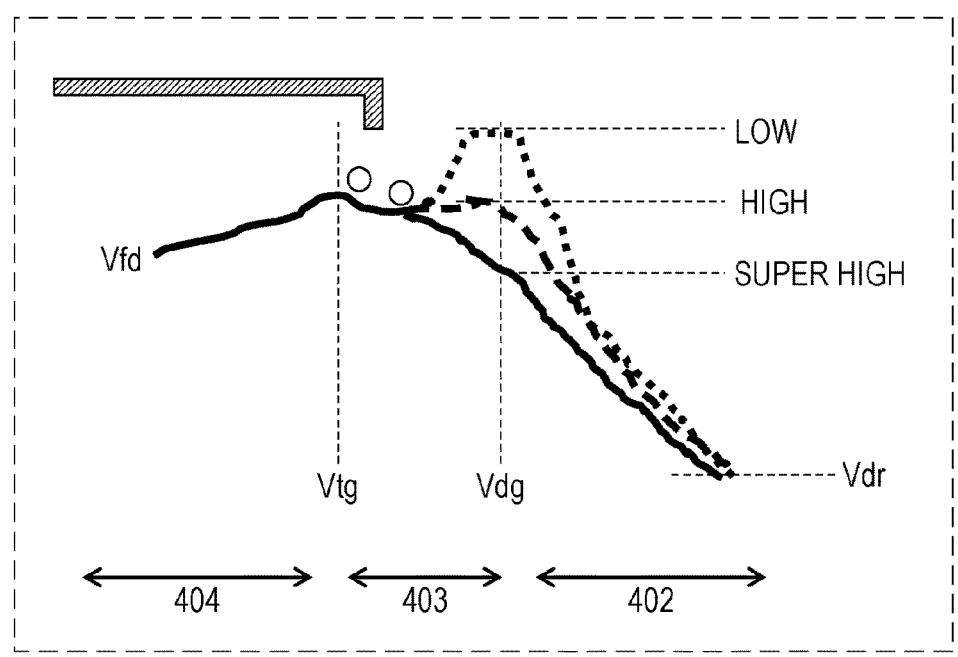
FIG. 9E is a diagram schematically illustrating potential of signal charge (electron) along a IXE-IXE line in FIG. 9C.

FIG. 9E is a diagram schematically illustrating potential of electrons that are signal charge along a IXE-IXE line in FIG. 9C. The potential of the signal charge changes as illustrated in FIG. 9E, under ternary control of the voltage Vdg in the present embodiment. For example, when a change from HIGH to Super High occurs, a potential barrier decreases, which suppresses leakage of electric charge to the floating diffusion layer 404 due to the surface reflection component I1 of the pulsed light. In the present embodiment, as the voltage Vdg increases, the potential barrier decreases, making it easier to transfer the electric charge from the photodiode 403 to the drain 402.

Figure 10A:
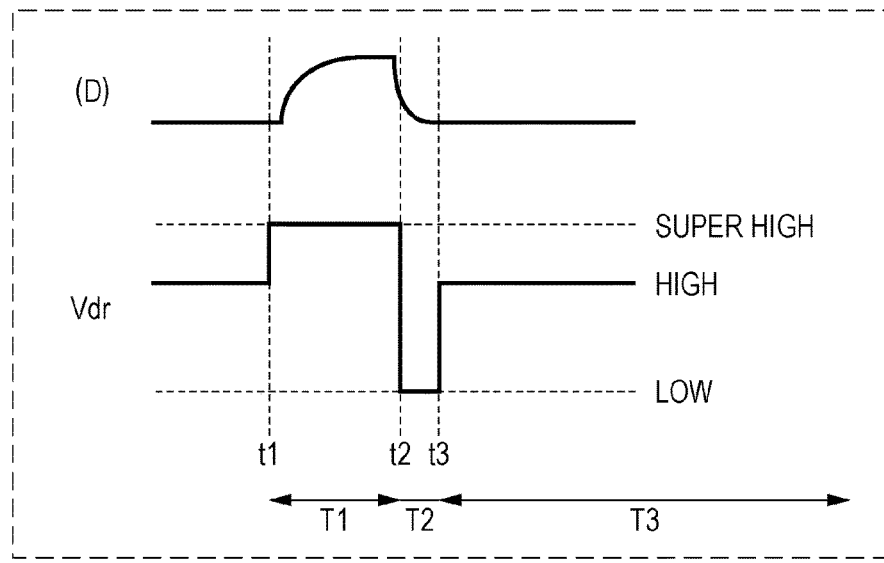
FIG. 10A is a timing chart illustrating control in a modification of the second embodiment.
Figure 10B:
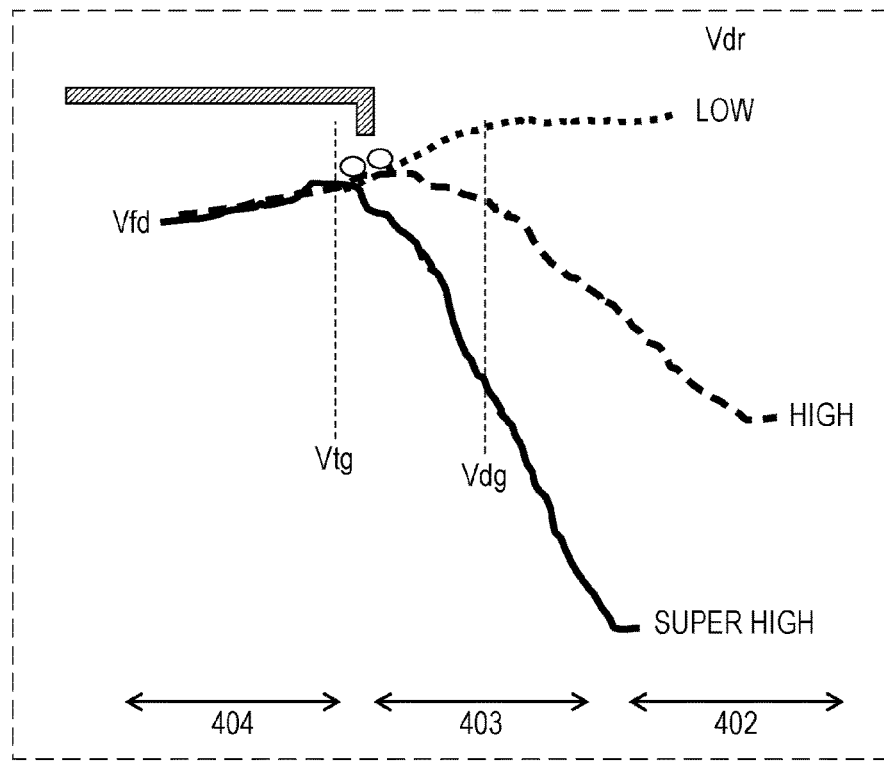
FIG. 10B is a diagram schematically illustrating potential of signal charge in the modification of the second embodiment.

FIG. 10A is a timing chart illustrating control in a modification of the present embodiment. In the present modification, ternary control is performed for the voltage Vdr of the drain, in place of the voltage Vdg of the drain gate. The voltage Vdg of the drain gate and the voltage Vtg of the transfer gate are constant. FIG. 10B is a diagram schematically illustrating the potential of the signal charge in the present modification. In this control method, as with the control method described above, it is possible to suppress leakage of the electric charge due to the surface reflection component I1 of the pulsed light.

Third Embodiment

Next, an imaging apparatus according to a third modification of the present disclosure will be described. The present embodiment is different from the second embodiment, in that pixels each include transfer gates, accumulators corresponding to the respective transfer gates, and control signal lines. Such a point different from the second embodiment will be mainly described below.

Figure 11A:
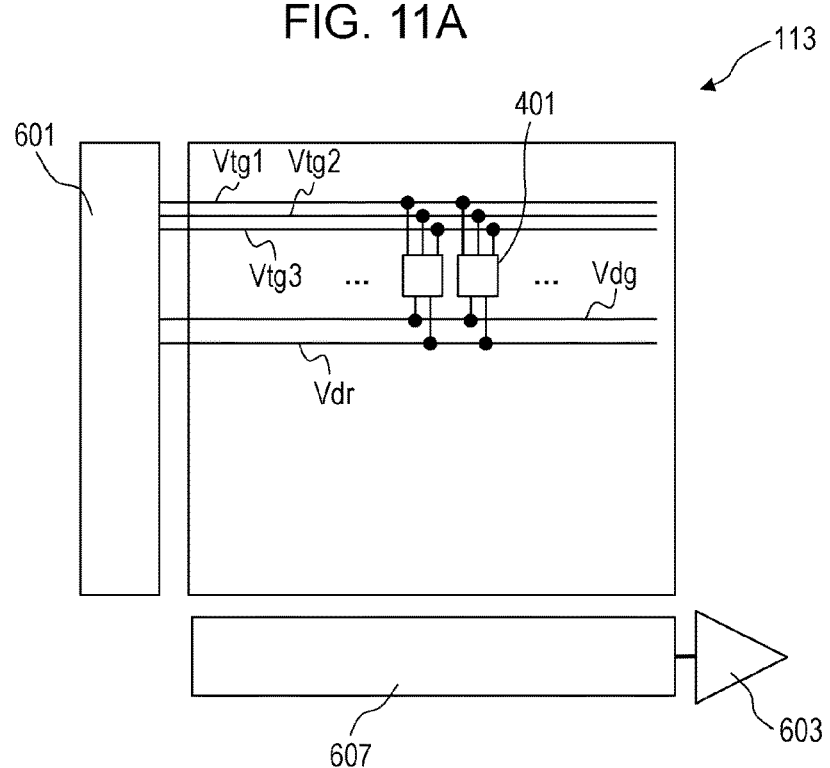
FIG. 11A is a diagram schematically illustrating a configuration of an image sensor according to a third modification.
Figure 11B:
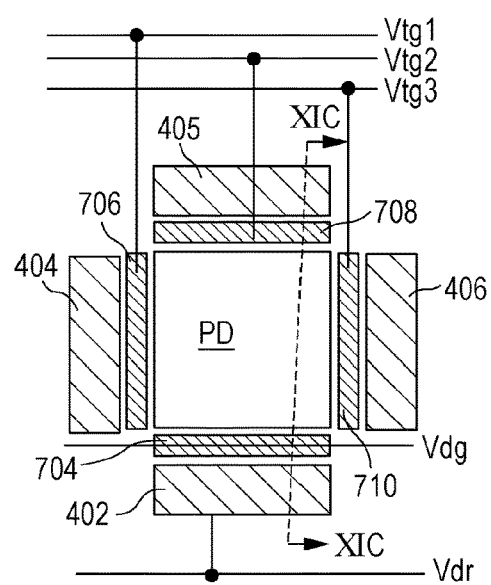
FIG. 11B is a plan view of a structure of one pixel in FIG. 11A.
Figure 11C:
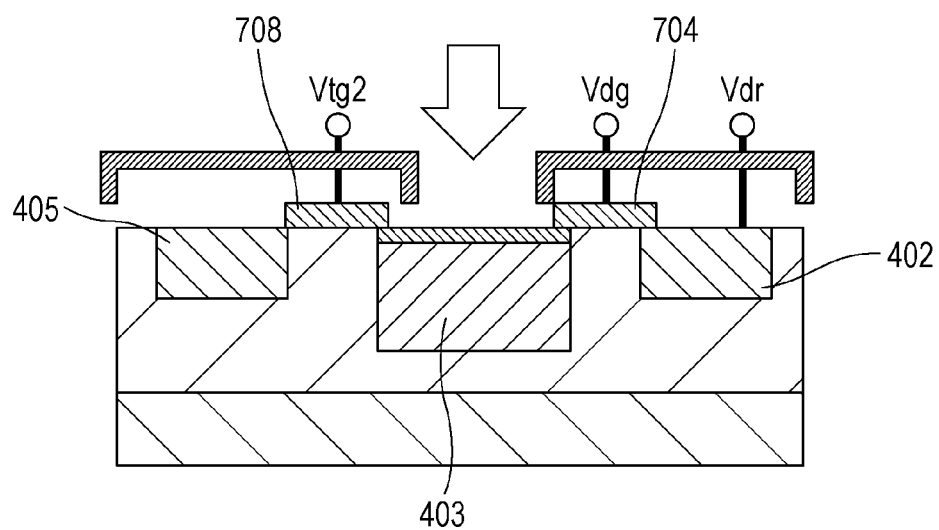
FIG. 11C is a cross section taken along an XIC-XIC line in FIG. 11B.

FIG. 11A is a diagram schematically illustrating a configuration of an image sensor 113 in the present embodiment. FIG. 11B is a plan view illustrating a structure of one pixel in FIG. 11A. FIG. 11C is a cross section taken along an XIC-XIC line in FIG. 11B. In the present embodiment, a pixel driving circuit 601 controls accumulation of electric charge to floating diffusion layers 404, 405, and 406 that are three accumulators, by performing voltage control different for each of a first transfer gate 706, a second transfer gate 708, and a third transfer gate 710 that are three independent transfer gates. The pixel driving circuit 601 also controls discharge of signal charge to the drain 402, by adjusting a voltage to be applied to a drain gate 704.

Figure 11D:
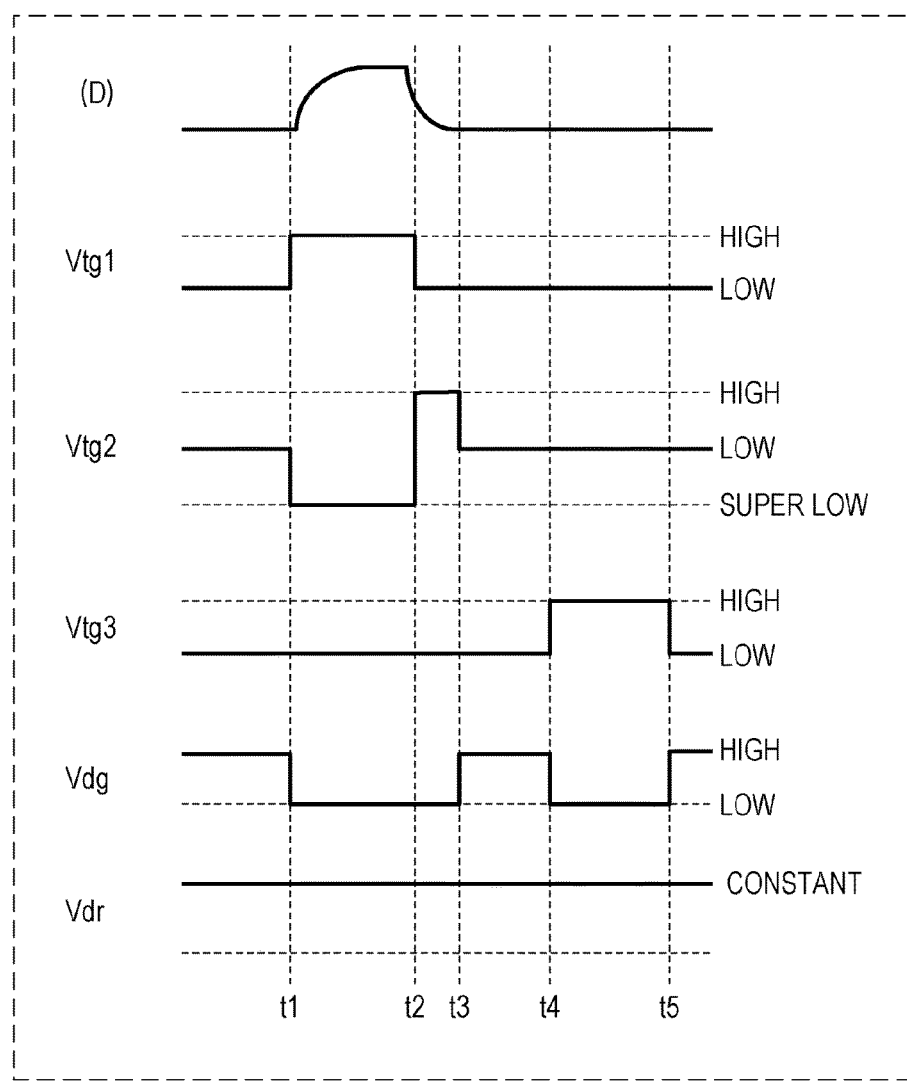
FIG. 11D is a timing chart illustrating control according to the third modification.

FIG. 11D is a timing chart illustrating control in the present embodiment. A voltage Vtg1 to be applied to the first transfer gate 706 is set to a level of HIGH in a period from a time t1 to a time t2, during which a surface reflection component I1 of reflected light is incident. The voltage Vtg1 is set to a level of LOW in other periods. Signal charge due to the surface reflection component I1 is thereby transferred to the floating diffusion layer 404 that is a first accumulator.

A voltage Vtg2 to be applied to the second transfer gate 708 is set to a level of Super LOW, which is the lowest voltage, in the period from the time t1 to the time t2. The voltage Vtg2 is set to a level of HIGH, which is the highest voltage, in a period from the time t2 to a time t3, during which an inside dispersion component I2 is incident. Further, the voltage Vtg2 is set to a level of LOW, which is the middle voltage, in other periods. A leakage component due to the surface reflection component I1 and a noise component due to background light and dark current are thereby suppressed, and signal charge due to the inside dispersion component I2 is accumulated in the floating diffusion layer 405 that is a second accumulator.

A voltage Vtg3 to be applied to the third transfer gate 710 is set to a level of HIGH in a period from a time t4 to a time t5, which is a period from the end of the incidence of the inside dispersion component I2 of the pulsed light to the arrival of the next pulsed light. The period from the time t4 to the time t5 may be set to have the same length as that of the period from the time t1 to the time t2. The voltage Vtg3 is set to a level of LOW in other periods. Signal charge due to background light and dark current is thereby accumulated in the floating diffusion layer 406 that is a third accumulator.

A voltage Vdg to be applied to the drain gate 704 is set to a level of LOW in a period in which a voltage of HIGH is applied to any of the first transfer gate 706, the second transfer gate 708, and the third transfer gate 710. The voltage Vdg is set to a level of HIGH in other periods. Unnecessary electric charge is thereby discharged.

In the present embodiment, a voltage Vdr to be applied to the drain 402 when electric charge is discharged is constant.

In this way, a signal Sa acquired by bringing the first transfer gate 706 into a conduction state mainly includes a surface reflection component. A signal Sb acquired by bringing the second transfer gate 708 into a conduction state mainly includes an inside dispersion component. A signal acquired by bringing the third transfer gate 710 into a conduction state includes a signal $S_{bg}$ due to background light and dark current.

In the present embodiment, it is possible to acquire a surface reflection component and an inside dispersion component by separating these components with high accuracy, in synchronization with light emission of one pulse, with almost no time lag. This is particularly effective for a measurement subject exhibiting behaviors varying between surface and inside. Further, it is possible to remove a component of background light from the signals Sa and Sb, by calculating $Sa-S_{bg}$ and $Sb-S_{bg}$. For this reason, a signal can be stably acquired, regardless of a change in surroundings.

As described above, according to the present embodiment, the pixels each have the accumulators and the transfer gates. The transfer gates are provided between a photoelectric conversion element and the accumulators. A control circuit controls efficiency of transferring signal charge from the photoelectric conversion element to each of the accumulators, by changing a voltage to be applied to each of the transfer gates. Specifically, in the first period in which the surface reflection component I1 is incident, a first voltage is applied to the transfer gate between one of the accumulators and the photoelectric conversion element. In the second period in which the inside dispersion component I2 is incident after ending of the incidence of the surface reflection component I1, a second voltage higher than the first voltage is applied to the transfer gate. In the third period in which none of the components of the pulsed light is incident, a third voltage higher than the first voltage and lower than the second voltage is applied to the transfer gate.

This makes it possible to suppress mixing of signal charge due to the surface reflection component I1 in the accumulator that detects the inside dispersion component I2, and to detect the surface reflection component I1 with other accumulator or detect a background light component, as with the first and second embodiments. Therefore, it is possible to perform measurement with higher accuracy, by removing the background light component from the signal of the surface reflection component I1 and the signal of the inside dispersion component I2.

(Modification)

Figure 11E:
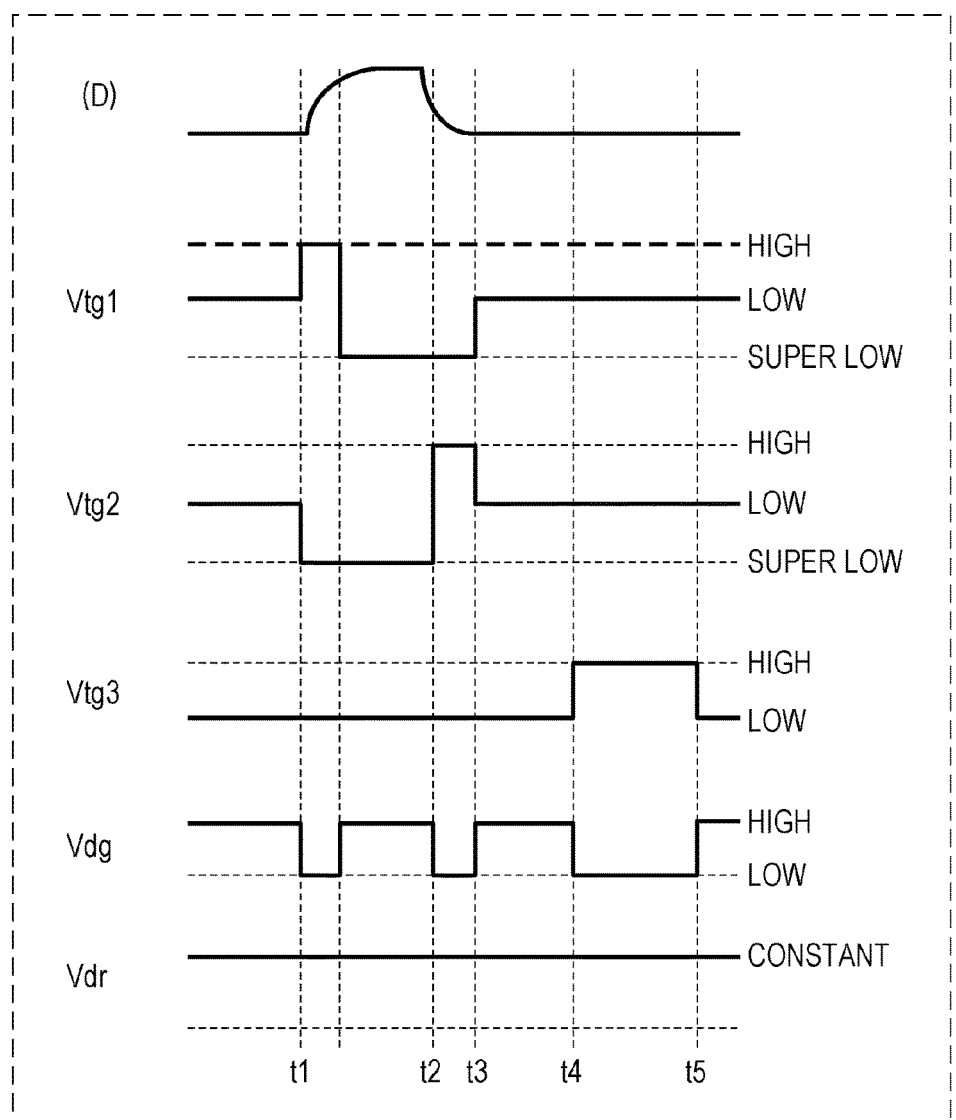
FIG. 11E is a timing chart illustrating control in a modification of the third modification.

FIG. 11E is a timing chart illustrating control in a modification of the third modification. The voltage Vtg1 to be applied to the first transfer gate 706 is set to the level of HIGH in part of the period from the time t1 to the time t2 during which the surface reflection component I1 of reflected light is incident. Here, in the control of the present modification, the period in which the voltage Vtg1 is set to the level of HIGH is shorter than that of the control illustrated in FIG. 11D. For example, the period in which the voltage Vtg1 is set to the level of HIGH may be set to have a length equal to that of the period in which the voltage Vtg2 to be applied to the second transfer gate 708 is set to the level of HIGH. Further, in FIG. 11E, after being set to the level of HIGH, the voltage Vtg1 is set to a level of Super LOW and then set to the level of LOW. However, this is only an example. The voltage Vtg1 may be set to the level of LOW immediately from the level of HIGH, without being set to the level of Super LOW. It is possible to acquire the surface reflection component I1 more, by limiting the period of the level of HIGH to a point near a rise time of the reflected light. The reason for this is as follows. There is a difference between the surface reflection component I1 and the inside dispersion component I2 of the reflected light, in terms of time before arrival at the imaging apparatus 101. The surface reflection component I1 arrives at the imaging apparatus 101 earlier, and therefore, a large amount of the surface reflection component I1 is included at the point near the rise time of the reflected light. Further, in the present modification, acquisition at the front end of the reflected light and acquisition at the rear end of the reflected light are equal in terms of the amount of exposure of the electronic shutter, and thus, a change in the number of emissions is unnecessary. It is therefore possible to perform stable measurement.

In the present modification, it is possible to acquire a surface reflection component and an inside dispersion component by separating these components with high accuracy, in synchronization with light emission of one pulse, with almost no time lag. This is particularly effective for a measurement subject exhibiting behaviors varying between surface and inside. Further, it is possible to remove a component of background light from the signals Sa and Sb, by calculating $Sa-S_{bg}$ and $Sb-S_{bg}$. For this reason, a signal can be acquired stably, regardless of a change in surroundings. Further, in the present modification, the signal Sb including a larger amount of surface reflection component acquired with Vtg1 is multiplied by an appropriate gain, and then subtracted from the signal Sa including a larger amount of inside dispersion component to be acquired with Vtg2. Therefore, there is such an effect that it is possible to extract only the inside dispersion component more efficiently.

Fourth Embodiment

Next, an imaging apparatus according to a fourth embodiment of the present disclosure will be described. The imaging apparatus of the present embodiment detects a concentration distribution of each of oxyhemoglobin and deoxyhemoglobin in the brain of a subject to be observed, and detects a temporal change therein. This makes it possible to generate a still image or moving image, which is a two-dimensional image indicating this concentration distribution. For example, it is possible to estimate brain activity (e.g., intensity or feelings) of the subject, by using information indicating this image. The imaging apparatus of the present embodiment can detect such biometric information in a non-contact manner, and thus can address inconvenience accompanying the detection. Further, it is possible to suppress leakage of part of signal charge to an accumulator due to a strong surface reflection component reflected off a surface of an object. This makes it possible to enhance detection accuracy of the biometric information greatly, as compared with existing techniques. A configuration and operation of the imaging apparatus of the present embodiment that can perform such highly accurate detection will be described below.

[Configuration]

Figure 12:
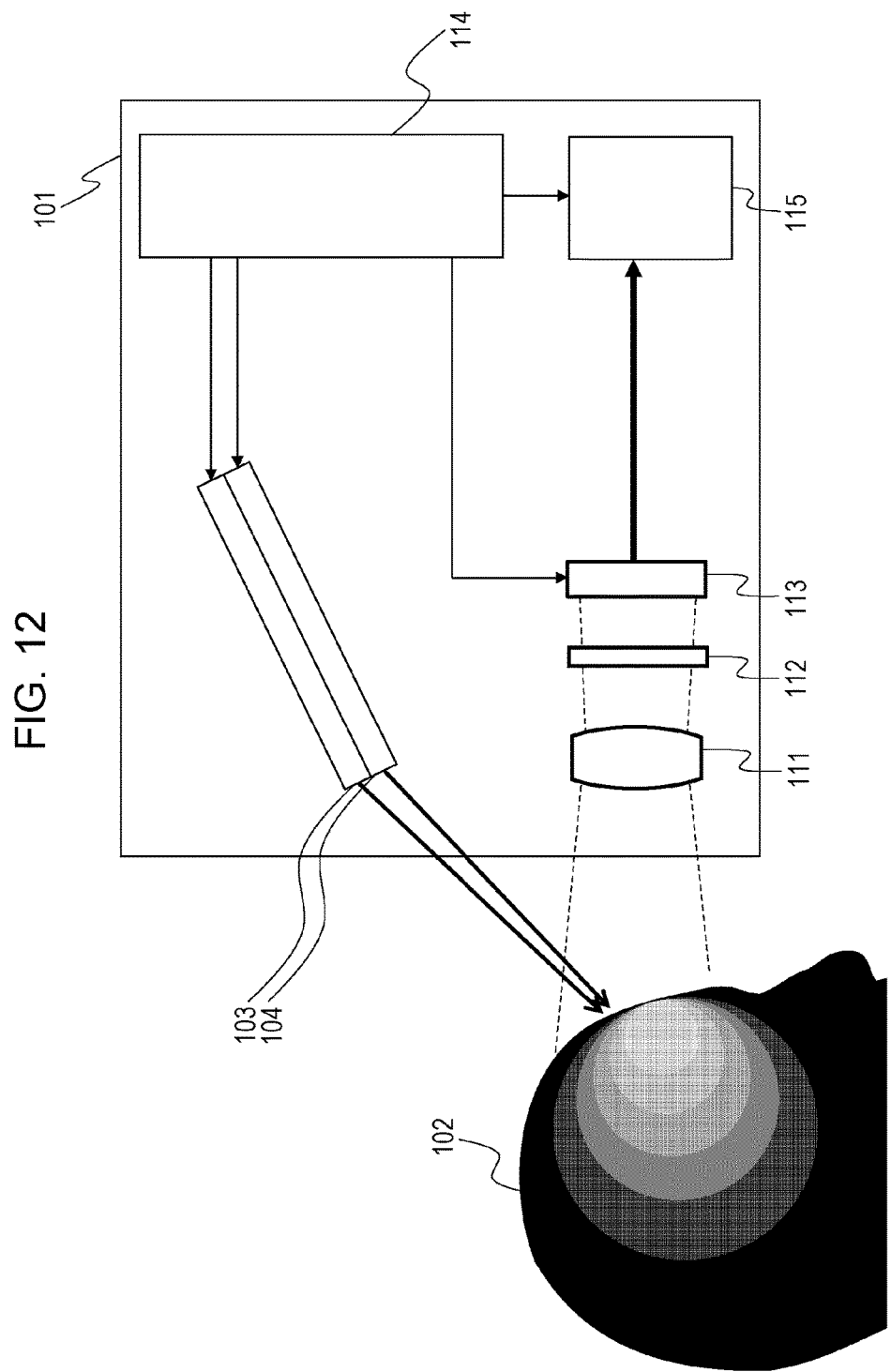
FIG. 12 is a diagram schematically illustrating a configuration of an imaging apparatus according to a fourth embodiment.

FIG. 12 is a diagram schematically illustrating a configuration of an imaging apparatus 101 in the present embodiment. FIG. 12 illustrates not only the imaging apparatus 101, but also a human head, which is an object 102 serving as a detection target. The imaging apparatus 101 of the present embodiment schematically has a configuration similar to that of the imaging apparatus 101 illustrated in FIG. 1. However, the present embodiment is different from the above-described study example, in that the number of light sources is two and an image sensor 113 has two accumulators.

The imaging apparatus 101 includes a light source 103, a light source 104, the image sensor 113, a double bandpass filter 112, an optical system 111, a control circuit 114, and a signal processing unit 115.

The light sources 103 and 104 emit pulsed light toward a point where the object 102 is located. In the present embodiment, the light source 103 is a laser light source that emits narrow-band pulsed light a having a center wavelength of 750 nm. The light source 104 is a laser light source emits narrow-band pulsed light having a center wavelength of 850 nm.

The image sensor 113 is disposed on an image plane of the optical system 111, and detects light reflected from the object 102. The optical system 111 is disposed between the object 102 and the image sensor 113, and may include one or more lenses.

The optical system 111 condenses light from the object 102 and thereby forms an image on an imaging plane of the image sensor 113. The double bandpass filter 112 is disposed between the optical system 111 and the image sensor 113, and mainly allows only light of two narrow-band wavelengths corresponding to the wavelengths of rays from the light sources 103 and 104 to pass therethrough.

The control circuit 114 is connected to the light sources 103 and 104 as well as the image sensor 113, and controls operation of these components. To be more specific, the control circuit 114 performs control, by synchronizing light emission timing of the light sources 103 and 104, with timing of signal accumulation and signal discharge of each pixel of the image sensor 113. This makes it possible to detect information indicating a cerebral blood flow in a living body with high accuracy.

The signal processing unit 115 is connected to the image sensor 113. On the basis of information, which is an electric signal outputted from the image sensor 113 and indicates light and darkness per pixel, the signal processing unit 115 generates image data (for example, data of a two-dimensional moving image) and outputs the generated image data. The generated image data is sent to, for example, a display (not illustrated) that can display an image illustrating a state of a cerebral blood flow. The signal processing unit 115 may be provided in an apparatus provided outside the imaging apparatus 101. For example, an external computer connected to the imaging apparatus 101 by wire or wirelessly may include the signal processing unit 115. According to such an aspect, it is not necessary for the imaging apparatus 101 to perform computation with a high calculation load, and therefore, it is possible to configure the imaging apparatus 10 at low cost.

The imaging apparatus 101 can include other components not illustrated in FIG. 12. For example, the imaging apparatus 101 may include an optical system such as a mirror that changes the traveling direction of light from the light sources 103 and 104, a communication circuit that performs wireless communication, and the like.

It is not necessary for each component illustrated in FIG. 12 to be disposed inside the same housing. For example, the imaging apparatus 101 can be implemented by combining an information terminal such as a smartphone or a tablet computer with other device connected to this information terminal. Such other device can include the light sources 103 and 104, the image sensor 113, the double bandpass filter 112, and the optical system 111. It is possible to cause a processor (e.g., a CPU and a GPU) of the information terminal to function as the control circuit 114 and the signal processing unit 115, by installing specific software onto the information terminal.

Each of the components will be described in more detail below.

[Light Sources 103 and 104]

The light source 103 in the present embodiment is a laser pulse light source that emits narrow-band pulsed light having a center wavelength of 750 nm. The light source 104 is a laser pulse light source that emits narrow-band pulsed light having a center wavelength of 850 nm. As will be described later, the light sources 103 and 104 each emit pulsed light repeatedly in a predetermined pattern determined by the control circuit 114. The pulsed light emitted by the light sources 103 and 104 can be, for example, rectangular light in which a fall time, which is a time from start of a fall to completion of the fall, is close to zero. A rise time, which is a time from start of a rise to completion of the rise, of the pulsed light generated by the light sources 103 and 104 is freely determined. The light sources 103 and 104 can each be a light source such as a laser diode in which a fall part of pulsed light is nearly perpendicular to a time axis (i.e., have time response characteristics of rapid progress type). Any type of light source that emits pulsed light can be used for each of the light sources 103 and 104. Examples of this light source include a semiconductor laser, a solid-state laser, and a fiber laser.

In the imaging apparatus 101 of the present embodiment, the object 102 is a human body, and therefore, the light sources 103 and 104 reflecting consideration of an influence on retina can be used. For example, when a laser light source is used, a light source satisfying Class 1 of laser safety standards devised in each country can be used. When Class 1 is satisfied, the object 102 is irradiated with light of low light intensity to the extent that accessible emission limit (AEL) is below 1 mW. Even if each of the light sources 103 and 104 itself does not satisfy Class 1, the light sources 103 and 104 are acceptable if the light sources 103 and 104 each satisfy Class 1 when combined with other optical element. For example, Class 1 of the laser safety standard may be satisfied by diffusing or attenuating light, by providing an element such as a diffuser or ND filter between each of the light sources 103 and 104 and the object 102.

The wavelengths of rays emitted by the light sources 103 and 104 are not limited to 750 nm and 850 nm, respectively. For example, light of any wavelength included in a wavelength range from 650 nm or more and 950 nm or less can be used. This wavelength range is called "in vivo window" and has a property of being relatively resistant to absorption into water and hemoglobin in a living body. When a living body is a detection target, it is possible to increase detectivity by using light in the above-described wavelength range. As in the present embodiment, when concentration of oxyhemoglobin and deoxyhemoglobin in a cerebral blood flow of the object 102 is to be detected, light to be used can be near-infrared light of a wavelength longer than 805 nm, and red light or near-infrared light of a wavelength shorter than 805 nm. Oxyhemoglobin relatively well absorbs light of a wavelength longer than 805 nm, as compared with deoxyhemoglobin. In contrast, deoxyhemoglobin relatively well absorbs light of a wavelength shorter than 805 nm, as compared with oxyhemoglobin. It is therefore possible to detect a change in concentration of each of oxyhemoglobin and deoxyhemoglobin in a blood flow with high accuracy, by using light of a wavelength longer than 805 nm, and light of a wavelength shorter than 805 nm. In this way, it is possible to analyze a property of a detection target, by selecting a plurality of wavelengths varying in absorption factor for the detection object. When detecting other kinds of biometric information (e.g., a heartbeat, a volume of blood flow, and a blood pressure), it is not necessary to use light of a plurality of wavelengths. Control similar to that in the present embodiment may be performed using the one light source 103, as with the configuration illustrated in FIG. 1.

In the present disclosure, the object 102 is not limited to a living body. For example, any of other types of light dispersing bodies such as gas, medicine, and food can be adopted as the object 102. The wavelength region of the light emitted by each of the light sources 103 and 104 is not limited to a range of about 700 nm or more to about 2,500 nm or less, which is a wavelength region of near-infrared rays. For example, the wavelength region may be a range of about 400 nm or more to about 700 nm or less, which is a wavelength region of visible light. Alternatively, the wavelength region may be a range of about 10 nm or more to about 400 nm or less, which is a wavelength region of ultraviolet rays. Mid-infrared rays, far-infrared rays, or electromagnetic waves such as terahertz waves or millimeter waves can also be used depending on an intended use.

As described with reference to FIG. 1, the light arriving at the object 102 from the light sources 103 and 104 is divided into a surface reflection component I1 and an inside dispersion component I2. The surface reflection component I1 is a component reflected off a surface of the object 102. The inside dispersion component I2 is a component reflected or dispersed once, or multiply dispersed, in inside of the object 102. The surface reflection component I1 and the inside dispersion component I2 each change a traveling direction by reflection or dispersion, and part thereof arrives at the image sensor 113 after passing through the optical system 111 and the double bandpass filter 112.

[Optical System 111 and Double Bandpass Filter 112]

The optical system 111 in the present embodiment is a camera lens that implements a telecentric optical system. It is possible to reduce light that diagonally incident on each of the pixels, by using the optical system 111 of telecentric type. It is therefore possible to simplify signal processing. The optical system 111 may be a non-telecentric optical system.

Figure 13:
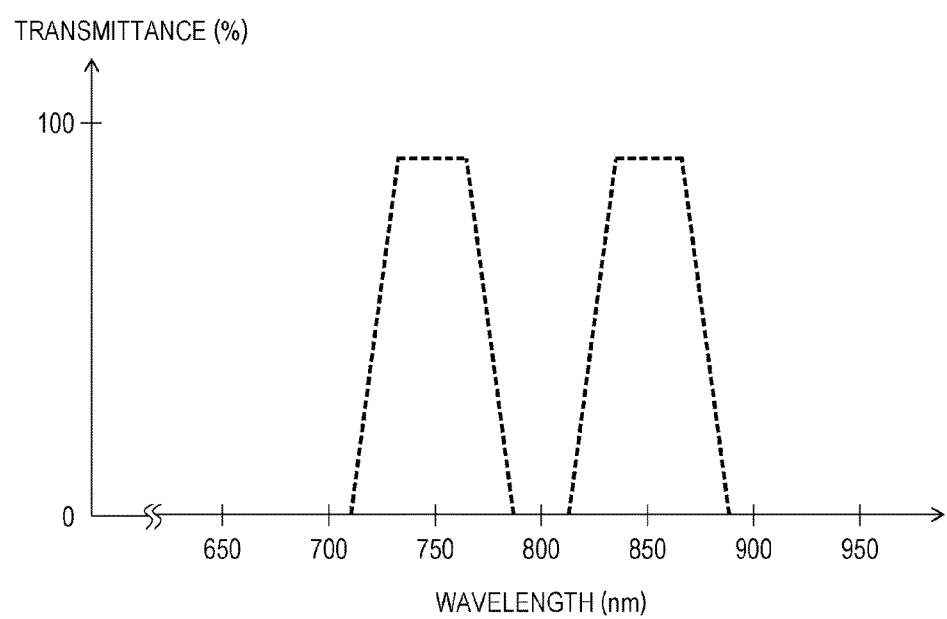
FIG. 13 is a graph illustrating an example of a spectral transmittance of a double bandpass filter.

The double bandpass filter 112 is a filter that mainly allows light of two wavelengths of 750 nm and 850 nm. FIG. 13 is a graph illustrating an example of spectral transmittance of the double bandpass filter 112. The double bandpass filter 112 allows narrow-band light having a center wavelength of 750 nm and narrow-band light having a center wavelength of 850 nm emitted from the light sources 103 and 104, respectively, and blocks light of other wavelengths. It is possible to suppress incidence of disturbance light (e.g., background light) on the image sensor 113, by disposing the double bandpass filter 112 described above.

[Image Sensor 113]

The image sensor 113 receives light emitted from the light sources 103 and 104 and then reflected by the object 102. The image sensor 113 has pixels two-dimensionally arranged on an imaging plane, and acquires two-dimensional information indicating the inside of the object 102. The image sensor 113 can be, for example, a CCD image sensor or CMOS image sensor.

The image sensor 113 has an electronic shutter. The electronic shutter is a circuit that controls a shutter width corresponding to the length of an exposure period in which received light is converted into an effective electric signal and stored once. The circuit also controls time from ending of one exposure period to start of the next exposure period. In the present specification, a state where exposure is performed by the electronic shutter is expressed as "OPEN" or "ON", and a state where exposure is stopped by the electronic shutter is expressed as "CLOSE" or "OFF". The image sensor 113 can adjust a time from end of one period of exposure by the electronic shutter to start of the next period of exposure, on a timescale of sub-nanosecond (e.g., 30 ps or more and 1 ns or less). In the present embodiment, unlike a conventional time-of-flight (TOF) camera intended to measure a distance to an object, it is not necessary to make a shutter width larger than a pulse width. To correct brightness of an object, the conventional TOF camera detects all of pulsed light reflected from the object after being emitted from a light source. Therefore, in the conventional TOF camera, it is necessary to provide a shutter width larger than a pulse width of light. In contrast, in the imaging apparatus 101 of the present embodiment, it is not necessary to correct an amount of light from an object, and thus, it is not necessary to provide a shutter width larger than a pulse width. In the present embodiment, the shutter width can be, for example, of the order of 1 ns or more and 30 ns or less. According to the imaging apparatus 101 of the present embodiment, it is possible to make the shutter width shorter than that in a conventional apparatus, and therefore, it is possible to reduce dark current included in a detection signal.

Assume that the object 102 is, for example, the forehead of a person, and an intended purpose is to detect information such as a cerebral blood flow or the like. In this case, an attenuation factor of light in the inside of the object 102 is very large. For example, the light can be attenuated to a level of the order of one millionth. Therefore, to detect the inside dispersion component I2, a light amount may be short if the light amount corresponds to irradiation of only one pulse. In this case, the light sources 103 and 104 may emit pulsed light a plurality of times, and the image sensor 113 may perform exposure with the electronic shutter a plurality of times accordingly. According to such operation, a detection signal is multiplied, which makes it possible to improve sensitivity.

Figure 14:
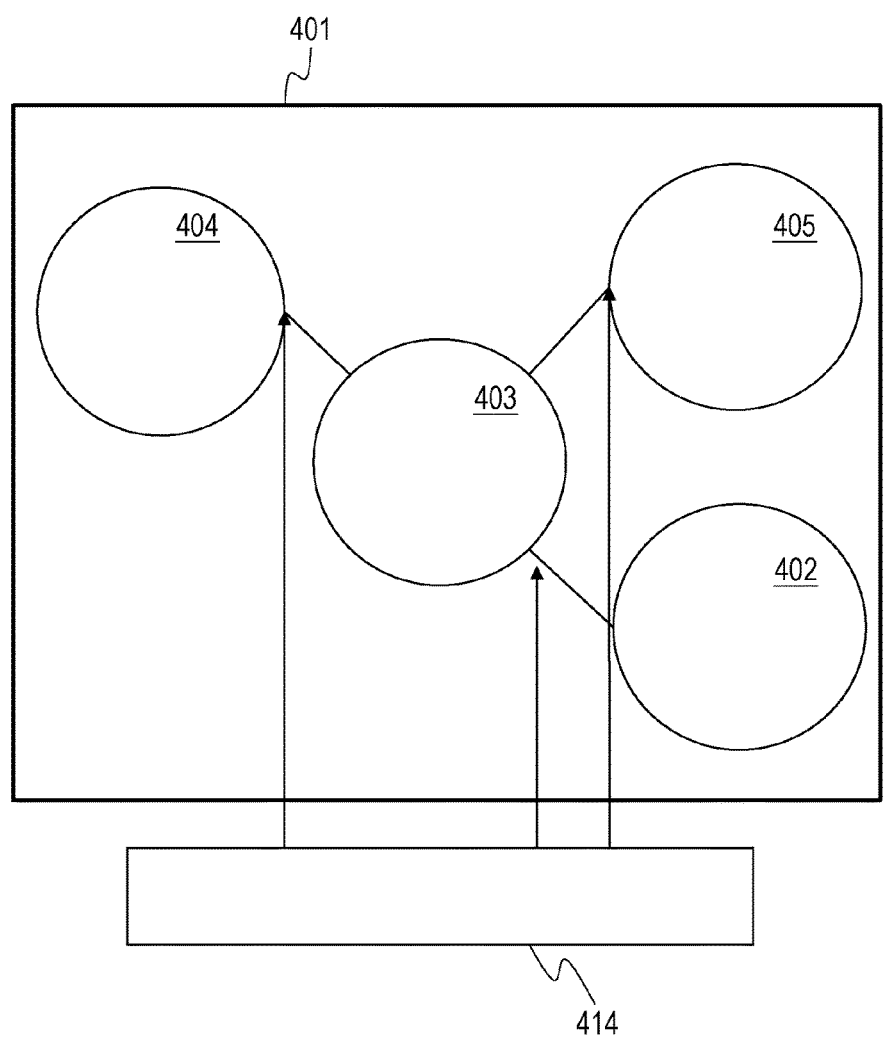
FIG. 14 is a diagram illustrating a schematic configuration of one pixel of an image sensor according to the fourth embodiment.

FIG. 14 is a diagram illustrating a schematic configuration example of one of pixels 401 of the image sensor 113. FIG. 14 schematically illustrates a configuration of one of the pixels 401, and does not necessarily reflect a real structure. The pixel 401 includes a photodiode 403, floating diffusion layers 404 and 405, and a drain 402. The photodiode 403 is a photoelectric conversion element that performs photoelectric conversion. The floating diffusion layers 404 and 405 are each an accumulator that accumulates signal charge. The drain 402 is a discharger that discharges signal charge.

The image sensor 113 includes a high-speed timing control circuit 414 that controls accumulation and discharge of signal charge in each of the pixels 401, on the basis of a command from the control circuit 114. The high-speed timing control circuit 414 can be a circuit (e.g., a microcontroller unit) having a processor and a memory. In accordance with a control program stored in the memory, the high-speed timing control circuit 414 controls accumulation of signal charge to the floating diffusion layers 404 and 405, and discharge of signal charge to the drain 402, in response to an instruction from the control circuit 114 externally provided. The image sensor 113 can perform imaging with a high time resolution, for light of a plurality of different wavelengths, by having the plurality of floating diffusion layers 404 and 405.

In the present embodiment, it is conceivable that light may leak isotropically with respect to the photodiode 403 at the center, because the optical system 111 of telecentric type is disposed on the front side of the image sensor 113. For this reason, the floating diffusion layers 404 and 405 can be disposed isotropically with respect to or at equal distances from the photodiode 403.

The light incident on each of the pixels 401 as a result of light emission of one pulse is converted by the photodiode 403 into signal electrons that are signal charge. The signal electrons resulting from the conversion are discharged to the drain 402, or distributed to either one of the floating diffusion layers 404 and 405, in accordance with a control signal inputted from the high-speed timing control circuit 414.

A specific configuration of the image sensor 113 in the present embodiment is similar to the configuration illustrated in FIGS. 11A to 11O. However, in the present embodiment, the number of floating diffusion layers is two.

In the present embodiment, the image sensor 113 of CMOS type is used. However, the image sensor 113 may be any of a CCD-type image sensor, a single photon counting element, and an amplification-type image sensor (e.g., EMCCD, or ICCD).

[Control Circuit 114 and Signal Processing Unit 115]

The control circuit 114 can be, for example, a combination of a microprocessor and a memory, or an integrated circuit such as a microcontroller including a processor and a memory built therein. The control circuit 114 provides a lighting instruction to each of the light sources 103 and 104, an imaging instruction to the image sensor 113, and an operation instruction to the signal processing unit 115, by, for example, execution of a control program recorded in a memory by a processor. On the basis of an instruction from the control circuit 114, the high-speed timing control circuit 414 in the image sensor 113 controls accumulation and discharge of the signal charge in each of the pixels.

The signal processing unit 115 is a circuit that processes an image signal outputted from the image sensor 113. The signal processing unit 115 can be implemented by, for example, a digital signal processor (DSP), a programmable logic device (PLD) such as a field programmable gate array (FPGA), or a combination of a central processing unit (CPU) or a graphic processing unit (GPU) and a computer program. The control circuit 114 and the signal processing unit 115 may be implemented by one unified circuit.

The signal processing unit 115 in the present embodiment generates moving image data, on the basis of a signal outputted from the image sensor 113. The moving image data indicates a concentration distribution of oxyhemoglobin and deoxyhemoglobin in brain and a temporal change therein. The signal processing unit 115 may generate other kind of information, without being limited to such moving image data. For example, the signal processing unit 115 may generate biometric information such as a blood flow in brain, a blood pressure, a degree of blood oxygen saturation, or a heart rate.

It is known that there is a close relationship between a change in cerebral blood stream volume or component in blood flow (e.g., hemoglobin) and a human neural activity. For example, the cerebral blood stream volume or the component in blood flow changes, as the neuronal activity changes in response to a change in human feeling. Therefore, it is possible to estimate a psychological condition of a subject, if it is possible to measure biometric information such as a change in cerebral blood stream volume or component in blood flow. Examples of the psychological condition of the subject include moods (e.g., pleasantness and unpleasantness), feelings (e.g., ease, anxiety, sadness, and anger), health conditions (e.g., cheerfulness and laziness), and temperature senses (e.g., hotness, coldness, and humidity). The examples of the psychological condition further include conditions deriving from the above examples, such as indexes representing the degrees of brain activities including a level of skill, a learning level, and a degree of concentration. The signal processing unit 115 may estimate a psychological condition such as a degree of concentration of a subject on the basis of a change such as a change in cerebral blood stream volume, and then output a signal indicating an estimation result.

[Operation]

Next, operation of the imaging apparatus 101 of the present embodiment will be described.

Most of energy of light at the wavelength of 750 nm or 850 nm emitted to the head, which is the object 102, is reflected off the surface of the object 102, as described with reference to FIG. 1. However, some component arrives at a deep part of the object 102 while being dispersed, and then a small amount of energy component being further dispersed arrives again at the surface of the forehead of the head as the inside dispersion component. Part of this light passes through the optical system 111 and the double bandpass filter 112, and then arrives at the image sensor 113.

Energy of the inside dispersion component arriving at the image sensor 113 can attenuate to a level of the order of about one 10,000th of the energy of the surface reflection component arriving at the image sensor 113. Since information indicating a brain activity is included in this attenuated component of light, how to remove an influence of the surface reflection component, which is noise of high energy, is an important issue.

Therefore, as with the example described with reference to FIG. 3, the control circuit 114 in the present embodiment sets the electronic shutter to CLOSE while the surface reflection component of the pulsed light is incident, and switches the electronic shutter to OPEN while the inside dispersion component is incident upon incidence of the rear end of the surface reflection component, in each of the pixels of the image sensor 113. The control circuit 114 maintains this OPEN state of the electronic shutter in a period corresponding to a light-emission pulse width, and then switches the electronic shutter to CLOSE again. Afterward, the next pulsed light is emitted, and the same operation is performed. Repeating the above-described operation removes a component due to the surface reflection component efficiently, thereby making it possible to detect only a component of the inside dispersion component that includes information indicating a brain activity.

A time from the start of light emission to switching of the electronic shutter from CLOSE to OPEN can be determined before start of detection. For example, it is possible to measure a time from the start of light emission to the arrival of the rear end of the surface reflection component at the image sensor 113, by performing preliminary emission of light with the light source 103 or the light source 104 and detecting this light with the image sensor 113, before the start of light emission. This measured time may be set as the time from the start of light emission to switching of the electronic shutter to OPEN.

Since the object 102 is the forehead of a person and the attenuation factor of light in the inside is very large, a light amount may be short to detect only the inside dispersion component if the light amount corresponds to emission of only one pulse. For this reason, in the present embodiment, pulsed light is emitted a plurality of times, and exposure is performed by the electronic shutter of the image sensor 113 a plurality of times accordingly. The detection signal is thereby multiplied, which makes it possible to enhance the sensitivity. However, depending on an intended use, it may not be necessary to perform each of light emission and exposure a plurality of times. In that case, light emission and exposure are performed once per frame, for each of the light sources.

As described above, even if the electronic shutter is CLOSE, not all the signal charge is discharged to the drain 402. Part of the signal charge due to a strong surface reflection component leaks into each of the floating diffusion layers. Therefore, in the present embodiment, to reduce the amount of this leakage signal charge, the sensitivity of the pixel is particularly lowered, in a period in which the surface reflection component is incident on the pixel.

Figure 15:
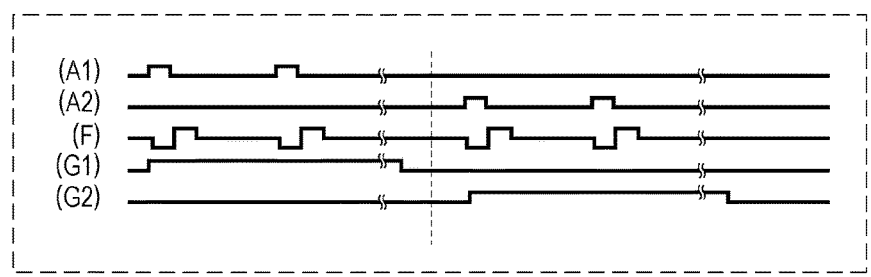
FIG. 15 is a system timing chart illustrating an example of operation of an imaging apparatus according to the fourth embodiment.

FIG. 15 is a system timing chart illustrating an example of operation of the imaging apparatus 101 in the present embodiment. In FIG. 15, a signal A1 indicates a waveform of pulsed light emitted from the light source 103 and a signal A2 indicates that from the light source 104. Further, a signal F indicates the sensitivity of the pixel. Furthermore, a signal G1 indicates timing of each of ON (i.e., a state that electric charge is accumulated in the floating diffusion layer) and OFF (i.e., a state that electric charge is not accumulated in the floating diffusion layer) of the floating diffusion layer 404, whereas a signal G2 indicates that of the floating diffusion layer 405. FIG. 15 exemplifies operation in a frame period that is a period of acquiring an image signal of one frame. One frame period is divided into a period in which imaging is performed using the light source 103 that emits light of the wavelength of 750 nm, and a period in which imaging is performed using the light source 104 that emits light of the wavelength of 850 nm. The control circuit 114 first causes the light source 103 to perform light emission a plurality of times in a predetermined cycle, and then causes the floating diffusion layer 404 to accumulate signal charge in synchronization with the light emission. Next, the control circuit 114 causes the light source 104 to perform light emission a plurality of times in a predetermined cycle, and then causes the floating diffusion layer 405 to accumulate signal charge in synchronization with the light emission. The signal charge accumulated in the floating diffusion layer 404 is used for generation of an image based on the light of the wavelength of 750 nm. The signal charge accumulated in the floating diffusion layer 405 is used for generation of an image based on the light of the wavelength of 850 nm. This operation will be described in more detail below.

The control circuit 114 first causes the light source 103, which emits the light of the wavelength of 750 nm, to emit pulsed light a plurality of times. For example, the control circuit 114 causes the light source 103 to emit pulsed light having a pulse width of about 10 ns, repeatedly around 1,000 times at a frequency of about 10 MHz for a period of the order of 100 μsec. While the light emission of the light source 103 is repeated, a first transfer gate 706 for the floating diffusion layer 404 is in an active state, and a second transfer gate 708 for the floating diffusion layer 405 is in an inactive state. In this state, the sensitivity of the pixel is controlled in synchronization with the light emission of the light source 103. To be more specific, the high-speed timing control circuit 414 in the image sensor 113 decreases the gate voltage of the first transfer gate 706 to the lowest and thereby decreases the sensitivity of the pixel to the lowest, in a period in which the surface reflection component I1 of the pulsed light from the object 102 is incident on the photodiode 403. In a period in which the inside dispersion component I2 of the pulsed light is incident on the photodiode 403, the high-speed timing control circuit 414 increases the gate voltage of the first transfer gate 706 to the highest and thereby increases the sensitivity of the pixel to the highest. In a period in which none of the components of the pulsed light is incident on the photodiode 403, the high-speed timing control circuit 414 brings the voltage level to the middle level. The signal charge generated in the photodiode 403 due to the inside dispersion component from the object 102 is repeatedly accumulated in the floating diffusion layer 404 by such control.

Upon completion of the accumulation of the signal charge in the floating diffusion layer 404, the control circuit 114 brings the first transfer gate 706 into an inactive state, and the second transfer gate 708 into an active state instead. In this state, the control circuit 114 starts pulsed-light emission of the light source 104 that emits the light of the wavelength of 850 nm. The pulsed-light emission of the light source 104 can be performed at the same frequency, and with the same pulse width, by the same number of times as those of the pulsed-light emission of the light source 103. Afterward, the sensitivity of the pixel is controlled in synchronization with the light emission of the light source 104. To be more specific, the high-speed timing control circuit 414 decreases the sensitivity of the pixel to the lowest, by performing control such as decreasing the gate voltage of the second transfer gate 708 to the lowest, in a period in which the surface reflection component I1 of the pulsed light from the object 102 is incident on the photodiode 403. In a period in which the inside dispersion component I2 of the pulsed light is incident on the photodiode 403, the high-speed timing control circuit 414 increases the sensitivity of the pixel to the highest, by performing control such as decreasing the gate voltage of the second transfer gate 708 to the lowest. In a period in which none of the components of the pulsed light is incident on the photodiode 403, the high-speed timing control circuit 414 brings the sensitivity of the pixel to the middle level. The signal charge generated in the photodiode 403 due to the inside dispersion component from the object 102 is repeatedly accumulated in the floating diffusion layer 405 by such control.

Upon completion of the above-described operation, the control circuit 114 causes the image sensor 113 to generate an electric signal based on the signal charge accumulated in each of the floating diffusion layers 404 and 405. The image sensor 113 transmits the generated electric signal to the signal processing unit 115. From the signal based on the signal charge accumulated in the floating diffusion layer 404, the signal processing unit 115 generates a pixel signal corresponding to 750 nm that is the wavelength of the light from the light source 103. Similarly, from the signal based on the signal charge accumulated in the floating diffusion layer 405, the signal processing unit 115 generates a pixel signal corresponding to 850 nm that is the wavelength of the light from the light source 104. The signal of each of the pixels of an image corresponding to each of the wavelengths of 750 nm and 850 nm is obtained by executing such operation for each of the pixels. By performing the above-described processing, the signal processing unit 115 generates image data for each of the wavelengths 750 nm and 850 nm.

The above-described configuration and operation makes it possible to remove a noise component mixed in a signal of each of the floating diffusion layer 404 and the floating diffusion layer 405. Therefore, a signal based on light dispersed inside a living body can be determined with high accuracy.

In the present embodiment, the two light sources 103 and 104 are used, but only one light source may be used. In a case where only one light source is used, only the exposure or accumulation of signal by using either one of the light sources among the operation illustrated in FIG. 15 may be performed.

As described above, according to the present embodiment, it is possible to acquire internal information of an object with high definition, in a state of no contact with the object, and in a state that noise due to a reflection component from a surface of the object and a dispersion component from immediately below the surface. In addition, according to the present embodiment, it is possible to measure an object by using a low-cost method, as compared with a conventional method.

What is claimed is:

1. An imaging apparatus comprising:
a light source that emits first pulsed light and second pulsed light toward an object;
an image sensor including pixels; and
a control circuit that controls the light source and the image sensor, wherein
the control circuit causes the light source to emit the second pulsed light later than the first pulsed light, and
when a time at which the first pulsed light starts arriving at the pixels after being reflected by the object is a first time,
a time at which the first pulsed light finishes arriving at the pixels is a second time, and
a time at which the second pulsed light starts arriving at the pixels after being reflected by the object is a third time,
the control circuit decreases sensitivity of the pixels during a first part of a first period, which begins at the first time and includes the second time, to a level lower than the sensitivity of the pixels during at least part of a second period, which elapses after the first period and ends at the third time, and
the control circuit increases the sensitivity of the pixels during a second part of the first period to a level higher than the sensitivity of the pixels during the at least part of the second period.

2. The imaging apparatus according to claim 1, wherein the first part of the first period is shorter than the at least part of the second period.

3. The imaging apparatus according to claim 1, wherein the pixels each include
a photoelectric converter that converts incident light into signal charge, and
an accumulator that accumulates the signal charge, wherein
the control circuit controls the sensitivity of the pixels by controlling transfer efficiency, which is a ratio of signal charge to be transferred to the accumulator to the signal charge converted by the photoelectric converter,
the control circuit increases the transfer efficiency during the second part of the first period to a level higher than the transfer efficiency during the at least part of the second period, and
the control circuit decreases the transfer efficiency during the first part of the first period to a level lower than the transfer efficiency during the at least part of the second period.

4. The imaging apparatus according to claim 3, wherein the pixels each further include a discharger that discharges the signal charge, and
the control circuit controls the transfer efficiency by changing a potential gradient between the photoelectric converter and the discharger.

5. The imaging apparatus according to claim 3, wherein the pixels each further include a discharger that discharges the signal charge, and
the control circuit controls the transfer efficiency by changing a voltage to be applied to the discharger.

6. The imaging apparatus according to claim 5, wherein the control circuit applies
a first voltage to the discharger during the first part of the first period,
a second voltage, which is lower than the first voltage, to the discharger, during the second part of the first period, and
a third voltage, which is lower than the first voltage and higher than the second voltage, to the discharger, during the at least part of the second period.

7. The imaging apparatus according to claim 3, wherein the pixels each further include
a discharger that discharges the signal charge, and
a gate, disposed between the photoelectric converter and the discharger, that transfers the signal charge to the discharger from the photoelectric converter in response to an instruction from the control circuit,
the control circuit controls the transfer efficiency by changing a voltage to be applied to the gate, and
the control circuit applies
a first voltage to the gate during the first part of the first period,
a second voltage, which is lower than the first voltage, to the gate, during the second part of the first period, and
a third voltage, which is lower than the first voltage and higher than the second voltage, to the gate during the at least part of the second period.

8. The imaging apparatus according to claim 1, wherein the pixels each include
a photoelectric converter that converts incident light into signal charge,
accumulators that accumulate the signal charge, and
gates, each of the gates disposed between the photoelectric converter and a respective accumulator of the accumulators, that transfer the signal charge from the photoelectric converter to the respective accumulator in response to an instruction from the control circuit,
the control circuit controls the sensitivity of the pixels by changing a voltage to be applied to each of the gates, and
the control circuit applies
a first voltage to at least one of the gates during the first part of the first period,
a second voltage, which is higher than the first voltage, to the at least one of the gates during the second part of the first period, and
a third voltage, which is higher than the first voltage and lower than the second voltage, to the at least one of the gates during the at least part of the second period.

9. An imaging apparatus comprising:
a light source that emits first pulsed light and second pulsed light toward an object;
an image sensor including pixels; and
a control circuit that controls the light source and the image sensor, wherein
the control circuit causes the light source to emit the second pulsed light later than the first pulsed light, and
when a period, in which an amount of a first surface reflection component included in the first pulsed light and reflected off a surface of the object is incident on the pixels is equal to or larger than an amount of an inside dispersion component included in the first pulsed light and dispersed inside of the object, is a third period,
a period, in which an amount of the inside dispersion component incident on the pixels is larger than the amount of the first surface reflection component, is a fourth period, and
a period, which begins at an end of incidence of the inside dispersion component on the pixels and ends at a start of incidence of a second surface reflection component included in the second pulsed light and reflected off the surface of the object on the pixels, is a fifth period, the control circuit increases sensitivity of the pixels during at least part of the fourth period to a level higher than the sensitivity of the pixels during at least part of the fifth period, and the control circuit decreases the sensitivity of the pixels during at least part of the third period to a level lower than the sensitivity of the pixels during the at least part of the fifth period.

10. The imaging apparatus according to claim 9, wherein the at least part of the third period is shorter than the at least part of the fifth period.

11. The imaging apparatus according to claim 9, wherein the pixels each include a photoelectric converter that converts incident light into signal charge, and an accumulator that accumulates the signal charge, wherein the control circuit controls the sensitivity of the pixels by controlling transfer efficiency, which is a ratio of signal charge to be transferred to the accumulator to the signal charge converted by the photoelectric converter, the control circuit increases the transfer efficiency during the at least part of the fourth period to a level higher than the transfer efficiency during the at least part of the fifth period, and the control circuit decreases the transfer efficiency during the at least part of the third period to a level lower than the transfer efficiency during the at least part of the fifth period.

12. The imaging apparatus according to claim 11, wherein the pixels each further include a discharger that discharges the signal charge, and the control circuit controls the transfer efficiency by changing a potential gradient between the photoelectric converter and the discharger.

13. The imaging apparatus according to claim 11, wherein the pixels each further include a discharger that discharges the signal charge, and the control circuit controls the transfer efficiency by changing a voltage to be applied to the discharger.

14. The imaging apparatus according to claim 13, wherein the control circuit applies a first voltage to the discharger during the at least part of the third period, a second voltage, which is lower than the first voltage, to the discharger, during the at least part of the fourth period, and a third voltage, which is lower than the first voltage and higher than the second voltage, to the discharger during the at least part of the fifth period.

15. The imaging apparatus according to claim 11, wherein the pixels each further include a discharger that discharges the signal charge, and a gate, disposed between the photoelectric converter and the discharger, that transfers the signal charge to the discharger from the photoelectric converter in response to an instruction from the control circuit, wherein the control circuit controls the transfer efficiency by changing a voltage to be applied to the gate, and the control circuit applies a first voltage to the gate during the at least part of the third period, a second voltage, which is lower than the first voltage, to the gate, during the at least part of the fourth period, and a third voltage, which is lower than the first voltage and higher than the second voltage, to the gate during the at least part of the fifth period.

16. The imaging apparatus according to claim 9, wherein the pixels each include a photoelectric converter that converts incident light into signal charge, accumulators that accumulate the signal charge, and gates, each of the gates disposed between the photoelectric converter and a respective accumulator of the accumulators, that transfer the signal charge from the photoelectric converter to the respective accumulator in response to an instruction from the control circuit, the control circuit controls the sensitivity of the pixels by changing a voltage to be applied to each of the gates, and the control circuit applies a first voltage to at least one of the gates during the at least part of the third period, a second voltage, which is higher than the first voltage, to the at least one of the gates during the at least part of the fourth period, and a third voltage, which is higher than the first voltage and lower than the second voltage, to the at least one of the gates during the at least part of the fifth period.

* * * * *